United States Patent
Bruno et al.

(10) Patent No.: US 11,159,519 B2
(45) Date of Patent: Oct. 26, 2021

(54) CONTEXTUAL INJECTION

(71) Applicant: AMERICAN EXPRESS TRAVEL RELATED SERVICES COMPANY, INC., New York, NY (US)

(72) Inventors: John Bruno, Scottsdale, AZ (US); Sibish Neelikattil Basheerahammed, Phoenix, AZ (US); Michael Fanning, Tempe, AZ (US); Christian Baker, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 788 days.

(21) Appl. No.: 15/442,945

(22) Filed: Feb. 27, 2017

(65) Prior Publication Data
US 2017/0201521 A1 Jul. 13, 2017

Related U.S. Application Data

(63) Continuation-in-part of application No. 15/338,654, filed on Oct. 31, 2016, which is a continuation-in-part of application No. 14/995,052, filed on Jan. 13, 2016, now abandoned, and a continuation-in-part of application No. 15/237,141, filed on Aug. 15, 2016,
(Continued)

(51) Int. Cl.
*H04L 29/06* (2006.01)
(52) U.S. Cl.
CPC ........ *H04L 63/0861* (2013.01); *H04L 63/105* (2013.01); *H04L 63/107* (2013.01)

(58) Field of Classification Search
None
See application file for complete search history.

(56) References Cited

U.S. PATENT DOCUMENTS

| 5,500,890 A | 3/1996 | Rogge et al. |
| 5,991,750 A | 11/1999 | Watson |

(Continued)

FOREIGN PATENT DOCUMENTS

| WO | 2014106207 | 7/2014 |
| WO | 2015102889 | 7/2015 |
| WO | 2015134947 | 9/2015 |

OTHER PUBLICATIONS

Australian Examination Report No. 3 dated Sep. 7, 2018 in Application No. 2017201307.
(Continued)

*Primary Examiner* — Azam A Ansari
*Assistant Examiner* — Robert C Johnson
(74) *Attorney, Agent, or Firm* — Thomas | Horstemeyer, LLP

(57) ABSTRACT

A system may deliver contextual services with dynamic intelligent behavior. The system may receive a first request from a device of a user. The system may retrieve a response to the request. The system may anticipate that the user is going to make a second request. The system may retrieve a response to the second request. The system may store the response to the second request in a temporary memory, such that the response may be quickly transmitted to the device if the user submits the second request. In some cases, the system may transmit the response to the second request without the user submitting the second request.

20 Claims, 11 Drawing Sheets

Related U.S. Application Data now Pat. No. 10,515,384, which is a continuation-in-part of application No. 15/154,106, filed on May 13, 2016, now abandoned.

(56) References Cited

U.S. PATENT DOCUMENTS

| | | | |
|---|---|---|---|
| 6,014,636 | A | 1/2000 | Reeder |
| 6,014,647 | A | 1/2000 | Nizzari et al. |
| 6,185,683 | B1 | 2/2001 | Ginter |
| 6,385,641 | B1* | 5/2002 | Jiang .................. H04L 29/06 709/203 |
| 6,965,868 | B1 | 11/2005 | Bednarek |
| 7,010,267 | B2 | 3/2006 | Vanluijt et al. |
| 7,147,149 | B2 | 12/2006 | Giraldin et al. |
| 7,254,388 | B2 | 8/2007 | Nam et al. |
| 7,353,208 | B1 | 4/2008 | Stambaugh |
| 7,364,071 | B2 | 4/2008 | Esplin et al. |
| 7,702,540 | B1 | 4/2010 | Woolston |
| 7,739,157 | B2 | 6/2010 | Bonner et al. |
| 7,926,717 | B2 | 4/2011 | McIntosh |
| 7,962,361 | B2 | 6/2011 | Ramchandani et al. |
| 8,015,088 | B2 | 9/2011 | Phillips et al. |
| 8,032,414 | B2 | 10/2011 | Payne et al. |
| 8,096,468 | B2 | 1/2012 | Myers et al. |
| 8,205,794 | B2 | 6/2012 | Myers et al. |
| 8,271,322 | B2 | 9/2012 | Ariyibi |
| 8,285,588 | B2 | 10/2012 | Postrel |
| 8,295,835 | B2 | 10/2012 | Coppinger |
| 8,369,842 | B2 | 2/2013 | Proctor, Jr. et al. |
| 8,385,896 | B2 | 2/2013 | Proctor, Jr. et al. |
| 8,423,048 | B2 | 4/2013 | Morrison |
| 8,483,714 | B2 | 7/2013 | Agardh et al. |
| 8,489,112 | B2 | 7/2013 | Roeding et al. |
| 8,533,000 | B1 | 9/2013 | Pletz et al. |
| 8,534,551 | B2 | 9/2013 | Rothschild |
| 8,538,389 | B1 | 9/2013 | Evans et al. |
| 8,567,671 | B2 | 10/2013 | Myers |
| 8,571,937 | B2 | 10/2013 | Rose et al. |
| 8,589,245 | B2 | 11/2013 | Michaelis et al. |
| 8,600,804 | B2 | 12/2013 | Ramchandani et al. |
| 8,618,932 | B2 | 12/2013 | Maia et al. |
| 8,666,891 | B2 | 3/2014 | Roberts |
| 8,676,663 | B1 | 3/2014 | Robinson et al. |
| 8,688,460 | B1 | 4/2014 | Pletz et al. |
| 8,700,530 | B2 | 4/2014 | Smith |
| 8,738,435 | B2 | 5/2014 | Libman |
| 8,740,064 | B2 | 6/2014 | Griffin et al. |
| 8,744,939 | B2 | 6/2014 | Phillips et al. |
| 8,750,868 | B2 | 6/2014 | Laroia et al. |
| 8,774,753 | B2 | 7/2014 | Jabara et al. |
| 8,798,647 | B1 | 8/2014 | Haney |
| 8,818,268 | B2 | 8/2014 | Matoba et al. |
| 8,825,085 | B1 | 9/2014 | Boyle et al. |
| 8,825,538 | B2 | 9/2014 | Insolia et al. |
| 9,015,277 | B1 | 4/2015 | Slavin |
| 9,326,226 | B2 | 4/2016 | Bahram |
| 9,665,881 | B1 | 5/2017 | Ward |
| 9,833,714 | B2 | 12/2017 | Charles |
| 10,108,791 | B1* | 10/2018 | Masterman .............. G06F 21/32 |
| 2002/0147639 | A1 | 10/2002 | Williams |
| 2003/0028481 | A1 | 2/2003 | Flitcroft |
| 2003/0220835 | A1 | 11/2003 | Barnes |
| 2004/0098332 | A1 | 5/2004 | Dvir |
| 2005/0049765 | A1 | 3/2005 | Chetia |
| 2005/0125360 | A1* | 6/2005 | Tidwell ................ G06Q 20/042 705/65 |
| 2005/0159863 | A1 | 7/2005 | Howard |
| 2006/0047546 | A1 | 3/2006 | Taylor et al. |
| 2006/0293967 | A1 | 12/2006 | Deluca |
| 2007/0061216 | A1 | 3/2007 | Jain et al. |
| 2007/0264974 | A1 | 11/2007 | Frank |
| 2008/0109317 | A1 | 5/2008 | Singh |
| 2008/0114646 | A1 | 5/2008 | Ash |
| 2008/0262901 | A1 | 10/2008 | Banga |
| 2008/0294621 | A1* | 11/2008 | Kanigsberg ........ G06Q 30/0625 |
| 2009/0171853 | A1 | 7/2009 | Georgiou et al. |
| 2009/0254971 | A1 | 10/2009 | Herz |
| 2010/0082446 | A1 | 4/2010 | Hjelm et al. |
| 2010/0131347 | A1 | 5/2010 | Sartipi |
| 2010/0145730 | A1 | 6/2010 | Abreu |
| 2010/0146607 | A1 | 6/2010 | Piepenbrink |
| 2010/0180009 | A1 | 7/2010 | Callahan |
| 2010/0320266 | A1 | 12/2010 | White |
| 2011/0231272 | A1 | 9/2011 | Englund et al. |
| 2011/0258049 | A1 | 10/2011 | Ramer |
| 2012/0022944 | A1 | 1/2012 | Volpi |
| 2012/0066084 | A1 | 3/2012 | Sneyders |
| 2012/0201381 | A1* | 8/2012 | Miller .................. H04L 9/3271 380/255 |
| 2012/0233158 | A1 | 9/2012 | Braginsky |
| 2012/0265596 | A1 | 10/2012 | Mazed |
| 2012/0324242 | A1 | 12/2012 | Kirsch |
| 2013/0204697 | A1 | 8/2013 | Boal |
| 2013/0217332 | A1 | 8/2013 | Altman et al. |
| 2013/0251216 | A1 | 9/2013 | Smowton et al. |
| 2013/0297422 | A1 | 11/2013 | Hunter |
| 2013/0325891 | A1 | 12/2013 | Masood et al. |
| 2013/0326009 | A1 | 12/2013 | Morgan |
| 2014/0046794 | A1 | 2/2014 | Vallery |
| 2014/0058841 | A1 | 2/2014 | Getchius |
| 2014/0058875 | A1 | 2/2014 | Yanchenko |
| 2014/0095580 | A1 | 4/2014 | Sartini |
| 2014/0108108 | A1 | 4/2014 | Artman et al. |
| 2014/0122228 | A1 | 5/2014 | Wical |
| 2014/0188733 | A1 | 7/2014 | Granbery |
| 2014/0214429 | A1 | 7/2014 | Pantel |
| 2014/0344011 | A1 | 11/2014 | Dogin |
| 2015/0073980 | A1 | 3/2015 | Griffin et al. |
| 2015/0120558 | A1 | 4/2015 | Andrews |
| 2015/0140982 | A1 | 5/2015 | Postrel |
| 2015/0142438 | A1 | 5/2015 | Dai |
| 2015/0220924 | A1 | 8/2015 | Bakker |
| 2015/0230045 | A1 | 8/2015 | Johnson |
| 2015/0248702 | A1 | 9/2015 | Chatterton |
| 2015/0278824 | A1 | 10/2015 | Zabar |
| 2015/0302412 | A1 | 10/2015 | Bhanoo |
| 2015/0319579 | A1 | 11/2015 | Syrjarinne |
| 2015/0332240 | A1 | 11/2015 | Harwood |
| 2015/0339655 | A1 | 11/2015 | Basheerahammed et al. |
| 2015/0363861 | A1 | 12/2015 | Capel |
| 2015/0379581 | A1 | 12/2015 | Bruno et al. |
| 2015/0379601 | A1 | 12/2015 | Ouimet |
| 2015/0379650 | A1 | 12/2015 | Theobald |
| 2015/0381664 | A1 | 12/2015 | Bruno et al. |
| 2016/0019526 | A1 | 1/2016 | Granbery |
| 2016/0019536 | A1 | 1/2016 | Ortiz |
| 2016/0063476 | A1 | 3/2016 | Baldie |
| 2016/0267480 | A1 | 9/2016 | Metral |
| 2017/0091765 | A1 | 3/2017 | Lloyd |
| 2017/0201779 | A1* | 7/2017 | Publicover ......... H04N 21/4532 |

OTHER PUBLICATIONS

Non-Final office Action dated Nov. 21, 2018 in U.S. Appl. No. 14/515,813.

Notice of Allowance dated Dec. 26, 2018 in U.S. Appl. No. 14/339,284.

Final Office Action dated Apr. 12, 2019 in U.S. Appl. No. 15/237,141.

Final Office Action dated May 17, 2019 in U.S. Appl. No. 15/154,106.

Notice of Allowance dated Jun. 27, 2018 in U.S. Appl. No. 14/469,230.

Final Office Action dated Jul. 6, 2018 in U.S. Appl. No. 14/284,817.

Advisory Action dated Jul. 30, 2018 in U.S. Appl. No. 14/318,091.

U.S. Appl. No. 16/109,046, filed Aug. 22, 2018 and titled "Transactions Using a Bluetooth Low Energy Beacon".

USPTO; Final Office Action dated Sep. 22, 2016 in U.S. Appl. No. 14/469,230.

USPTO; Advisory Action dated Nov. 4, 2016 in U.S. Appl. No. 14/469,230.

Advisory Action dated Nov. 19, 2018 in U.S. Appl. No. 14/995,052.

Non-Final Office Action dated Jan. 14, 2019 in U.S. Appl. No. 15/154,106.

(56) References Cited

OTHER PUBLICATIONS

Non-Final Office Action dated Jan. 28, 2019 in U.S. Appl. No. 14/454,452.
Notice of Allowance dated Aug. 16, 2019 in U.S. Appl. No. 15/237,141.
Non-Final Office Action dated Jun. 10, 2019 in U.S. Appl. No. 14/995,052.
Non-Final Office Action dated Jun. 17, 2019 in U.S. Appl. No. 15/338,654.
Advisory Action dated Jun. 27, 2019 in U.S. Appl. No. 15/237,141.
Office Action dated Jan. 19, 2018 in Australian Application No. 2017201307.
Office Action dated Jul. 11, 2018 in Australian Application No. 2017201307.
Final Office Action dated Sep. 6, 2018 in U.S. Appl. No. 14/995,052.
Final Office Action dated Sep. 11, 2018 in U.S. Appl. No. 14/339,284.
Non-final Office Action dated Sep. 27, 2018 in U.S. Appl. No. 15/237,141.
"U.S. Appl. No. 14/284,817, filed May 22, 2014 and entitled Systems and Methods for Dynamic Proximity Based E-CommerceTransactions".
"U.S. Appl. No. 14/318,091, filed Jun. 27, 2014 and entitled System and Method for Contextual Services ExperienceTransactions".
U.S. Appl. No. 14/339,284, filed Jul. 23, 2014 and entitled Systems and Methods for Proximity Based Communication.
U.S. Appl. No. 14/454,452, filed Aug. 7, 2014 and entitled System and Method for Providing a Micro Registry.
U.S. Appl. No. 14/469,230, filed Aug. 26, 2014 and entitled System and Method for Providing a Bluetooth Low Energy Mobile Payment System.
International Search Report and Written Opinion dated Oct. 23, 2015 in Application No. PCT/US2015/041940.
International Search Report and Written Opinion dated Dec. 30, 2015 in Application No. PCT/US2015/051693.
International Preliminary Report on Patentabiliy dated Feb. 25, 2016 in Application No. PCT/US2015/041940.
Examination Report dated Feb. 26, 2016 in Australian Application No. 2015201925.
Office Action dated Mar. 11, 2016 in U.S. Appl. No. 14/469,230.
International Preliminary Report on Patentabiliy dated Mar. 28, 2016 in Application No. PCT/US2015/051693.
Office Action dated Apr. 25, 2016 in Canadian Application No. 2,888,085.
U.S. Appl. No. 15/154,106, filed May 13, 2016 and entitled Systems and Methods for Contextual Services Across Platforms Based on Selectively Shared Information.
Office Action dated Jul. 7, 2016 in U.S. Appl. No. 14/284,817.
Examination Report dated Aug. 3, 2016 in Australian Application No. 2015201925.
Office Action dated Aug. 12, 2016 in U.S. Appl. No. 14/454,452.
U.S. Appl. No. 15/237,141, filed Aug. 15, 2016 and entitled Systems and Methods for Contextual Services Using Voice Personal Assistants.
U.S. Appl. No. 15/338,654, filed Oct. 31, 2016 and entitled Contextual Identification and Information Security.
Final Office Action dated Nov. 10, 2016 in U.S. Appl. No. 14/284,817.
Office Action dated Nov. 17, 2016 in U.S. Appl. No. 14/339,284.
Examination Report dated Nov. 22, 2016 in Australian Application No. 2015201925.
Examination Report dated Jan. 23, 2017 in Australian Application No. 2015201925.
Advisory Action dated Jan. 25, 2017 in U.S. Appl. No. 14/284,817.
Examination Report dated Feb. 24, 2017 in Australian Application No. 2015201925.
"Pocket-lint, Apple's iBeacons explained: What it is and why it matters, retrieved from internet on Feb. 21, 2017, http://web.archive.org/web/20130925141212/http://www.pocket-lint.com/news/123730-apple-sibeacons-explained-what-it-is-and-why-it-matters> published on Sep. 25, 2013 as per WaybackMachine, 10 pages".
Final Office Action dated Mar. 16, 2017 in U.S. Appl. No. 14/454,452.
Office Action dated Mar. 24, 2017 in U.S. Appl. No. 14/318,091.
Final Office Action dated Mar. 28, 2017 in U.S. Appl. No. 14/339,284.
Office Action dated Apr. 14, 2017 in U.S. Appl. No. 14/469,230.
Advisory Action dated Jun. 12, 2017 in U.S. Appl. No. 14/339,284.
Extended European Search Report dated Jun. 16, 2017 in European Application No. 15851256.6.
Advisory Action dated Jul. 13, 2017 in U.S. Appl. No. 14/454,452.
Office Action dated Jul. 14, 2017 in U.S. Appl. No. 14/339,284.
Office Action dated Aug. 16, 2017 in U.S. Appl. No. 14/515,813.
Final Office Action dated Sep. 12, 2017 in U.S. Appl. No. 14/318,091.
Final Office Action dated Oct. 2, 2017 in U.S. Appl. No. 14/469,230.
Office Action dated Oct. 2, 2017 in U.S. Appl. No. 14/454,452.
Advisory Action dated Nov. 7, 2017 in U.S. Appl. No. 14/318,091.
Office Action dated Nov. 14, 2017 in U.S. Appl. No. 14/284,817.
Non-final Office Action dated May 23, 2018 in U.S. Appl. No. 14/339,284.
Advisory Action dated Nov. 17, 2017 in U.S. Appl. No. 14/469,230.
Final Office Action dated Dec. 29, 2017 in U.S. Appl. No. 14/339,284.
"U.S. Appl. No. 14/995,052, filed Jan. 13, 2018 and entitledSystem and Method for Creating and Administering Electronic-CredentialsCredentials".
Final Office Action dated Jan. 24, 2018 in U.S. Appl. No. 14/515,813.
Non-Final Office Action dated Feb. 9, 2018 in U.S. Appl. No. 14/318,091.
Advisory Action dated Feb. 15, 2018 in U.S. Appl. No. 14/339,284.
Non-Final Office Action dated Mar. 9, 2018 in U.S. Appl. No. 14/995,052.
Advisory Action dated Mar. 27, 2018 in U.S. Appl. No. 14/515,813.
Final Office Action dated Apr. 20, 2018 in U.S. Appl. No. 14/454,452.
Advisory Action dated Jun. 12, 2018 in U.S. Appl. No. 14/454,452.
Final Office Action dated Jun. 14, 2018 in U.S. Appl. No. 14/318,091.
Anonymous, Swirl Delivers First End-to-End In-Store Mobily Marketing Platform for Major Retailers, Oct. 17, 2013, PR Newsire. (Year: 2013).
Apple, Inc. "Getting Started with iBeacon Version 1.0," Jul. 2, 2014, entire document.
Final Office Action dated Sep. 6, 2019 in U.S. Appl. No. 14/454,452.
Advisory Action dated Jul. 29, 2019 in U.S. Appl. No. 15/154,106.

\* cited by examiner

|  | Device Type | Device Location | Current Activity | Time Since Last Interaction | Most Recent Auth Type | Device Score |
|---|---|---|---|---|---|---|
| Requesting Device | VPA | 38.8977 N, 77.0365 W | Funds Transfer | Present | Password | 7.2 |
| Device 2 | Smartphone | 38.8979 N, 77.0365 W | Internet search for "craft store" | 7 minutes | Biometric | 8.0 |
| Device 3 | Television | 38.8977 N, 77.0365 W | Recording "National Football League" | Present | None | 3.5 |
| Device 4 | Automobile Navigation | 38.8982 N, 77.0330 W | none | 41 minutes | None | 2.1 |
| Confidence Score |  |  |  |  |  | 20.8 |

FIG. 10

CONTEXTUAL INJECTION

CROSS-REFERENCE TO RELATED APPLICATIONS

This application is a continuation-in-part of, and claims priority to U.S. Ser. No. 15/338,654 titled "CONTEXTUAL IDENTIFICATION AND INFORMATION SECURITY," and filed on Oct. 31, 2016, the contents of which are incorporated by reference herein in their entirety. The '654 application is a continuation-in-part of, and claims priority to U.S. Ser. No. 14/995,052 titled "SYSTEM AND METHOD FOR CREATING AND ADMINISTERING ELECTRONIC CREDENTIALS," and filed on Jan. 13, 2016, the contents of which are incorporated by reference herein in their entirety. The '654 application is a continuation-in-part of, and claims priority to U.S. Ser. No. 15/237,141 titled "SYSTEMS AND METHODS FOR CONTEXTUAL SERVICES USING VOICE PERSONAL ASSISTANTS," and filed on Aug. 15, 2016, the contents of which are incorporated by reference herein in their entirety. The '141 application is a continuation-in-part of, and claims priority to U.S. application Ser. No. 15/154,106 entitled "SYSTEMS AND METHODS FOR CONTEXTUAL SERVICES ACROSS PLATFORMS BASED ON SELECTIVELY SHARED INFORMATION," and filed on May 13, 2016, the contents of which are incorporated by reference herein in their entirety for all purposes.

FIELD

The present disclosure relates to delivering contextual services, and more specifically, to systems and methods for delivering contextual services with dynamic intelligent behavior and decreased latency.

BACKGROUND

The internet of things allows individuals to interact with the internet via many different devices. The devices interact with individuals via a variety of interfaces, such as touchscreens, voice recognition, keyboards, etc. A user may submit a request to a device. However, the user may ultimately be searching for a response to a different request, and it may take several requests and responses for the user to obtain the information the user ultimately wants. Each request and response takes time and processing power, which can lengthen the time and cost for the user to obtain the desired information. Additionally, static, menu-driven responses may not provide helpful responses which predict the user's needs.

SUMMARY

A system, method, and computer readable medium (collectively, "system") for providing contextual services based on selectively shared user data is disclosed. The system may receive an initial request from a first device. The system may retrieve a response to the initial request. The system may anticipate a secondary request from the first device. The system may retrieve a response to the secondary request. The system may transmit to the first device the response to the secondary request.

In various embodiments, the system may store the response to the secondary request in a temporary memory. The system may retrieve the response to the secondary request simultaneously with transmitting the response to the initial request to the first device. The system may determine a likelihood that the computer-based system will receive the secondary request. The response to the secondary request may be retrieved in response to the likelihood being above a threshold level. The response to the secondary request may be transmitted without receiving the secondary request from the first device. The system may transmit the response to the secondary request in response to receiving the secondary request from the first device.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

FIG. 10 illustrates an example of a table for calculating a confidence score, in accordance with various embodiments.

DETAILED DESCRIPTION

Figure 1:
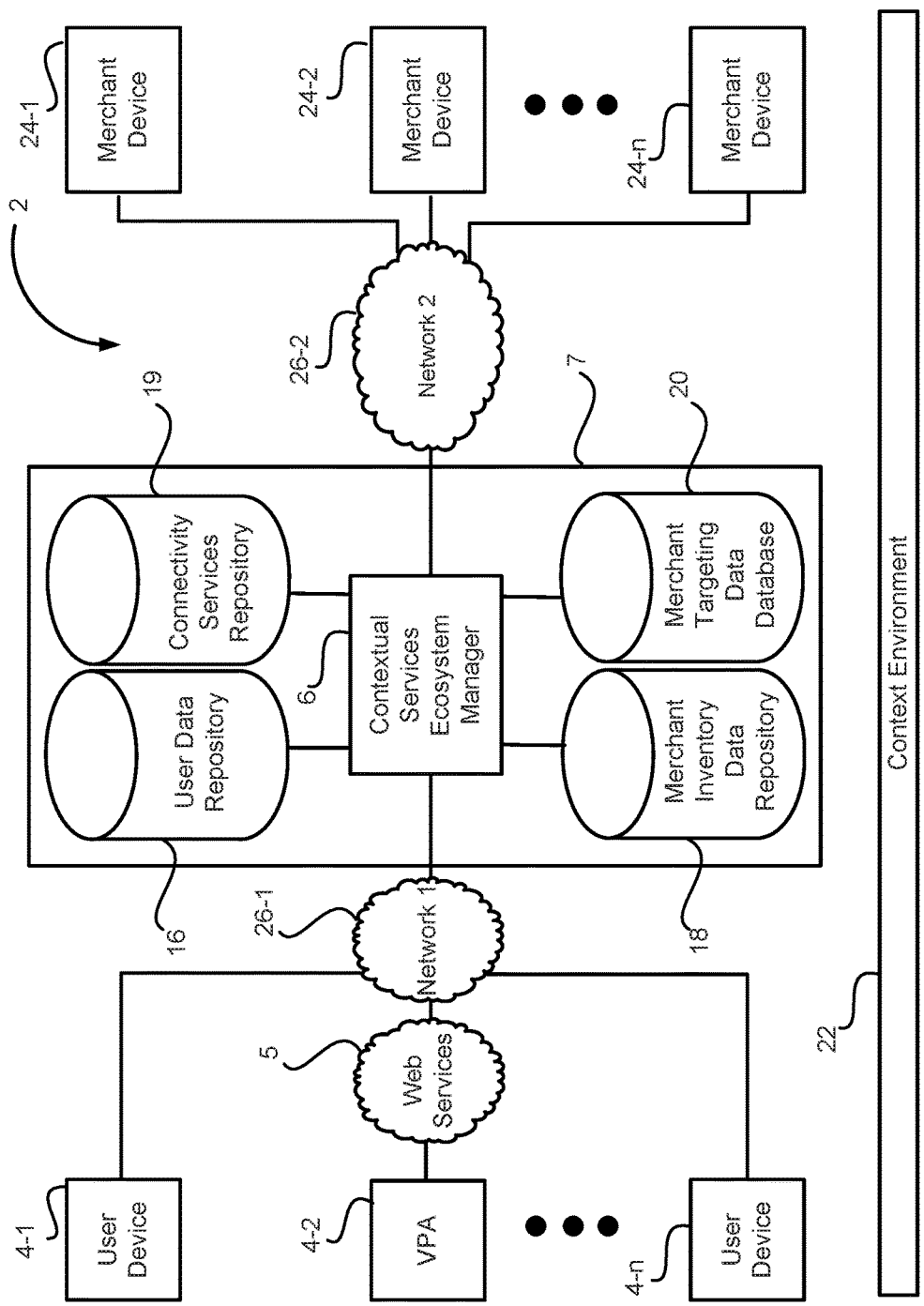
FIG. 1 illustrates various system components of a contextual services management system, in accordance with various embodiments.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

A user may interact with an internet connected device. A variety of devices may be used, such as mobile phones, televisions, computers, voice personal assistants ("VPA"), automobile touch screens, etc. An identity broker, which in various embodiments may be a contextual services management system, may receive data from one or more devices and calculate a confidence score that the user is authorized to perform various interactions with the device.

A wide variety of contextual information may be used by the identity broker to identify the user. For example, a user may be interacting with a VPA. The VPA may determine that the user is a particular individual based on a password spoken by the user. The VPA may pass this information to the identity broker. The identity broker may also receive information from other devices, such as a geolocation of the particular individual's mobile phone. The identity broker may determine that the mobile phone of the particular individual is in a close location to the VPA, and calculate a high level of confidence that the user is the particular individual. However, if the mobile phone leaves the geolocation area of the VPA, the identity broker may decrease the confidence score that a user still interacting with the VPA is the particular individual.

The identity broker may alter permissions of the user based on the confidence score. For example, a user with a very low confidence score may not be provided any access to the device. A user with a medium confidence score may be allowed to use the device for accessing the internet, but may be prevented from accessing confidential information of the particular individual or making financial transactions on behalf of the particular individual. A user with a high confidence score may be authorized to receive confidential information of the particular individual and make financial transactions on behalf of the particular individual.

The identity broker may determine whether the user is in a private or public setting. For example, the identity broker may determine that the device being used by the user is connected to a public wireless network, or a VPA may detect multiple voices in a room, and the identity broker may determine that the user is in a public setting. In response to determining that the user is in a public setting, the device may limit the amount of information displayed or spoken. For example, rather than asking a user to speak a user's password, the identity broker may transmit a one-time password to a mobile device of the user, and ask the user to speak the one time password. In various embodiments, the mobile device may not display or speak any confidential information if the user is in a public setting.

A contextual services system may enable merchants and users to engage and interact through electronic devices across varying platforms. Users may control their contextual experience as they interact with merchant applications over the web, on mobile devices, and in physical stores. Users may interact with a voice personal assistant to receive a customized user experience. Preferences may be updated and edited to fulfill user objectives while maintaining privacy and comfort levels. Information preferences such as interests, location, products, spend history, etc. can be selectively shared by the user with merchants so the contextual experience provided by a merchant is fully customized and relevant to the user. Merchants may respond to shared information in a variety of manners including, for example, a tailored user experience with relevant products and advertising to assist the user in their objectives.

The contextual services system may follow the user across merchant applications and sites, devices, and physical locations and provide a bridge between online and offline experiences. Users of the contextual services system may, for example, compare products across competing merchant web sites, access context from an in-store merchant visit on an electronic device, access web-store information for a merchant at an in-store location, compare products offered by competing merchants at a single interface point, speak with a voice personal assistant, or otherwise access contextual information from varying platforms. The contextual service systems of the present disclosure may facilitate highly relevant and customized engagements with any service provider application and is not limited to merchant applications.

The contextual services system allows users to interact with the contextual services system via a voice personal assistant ("VPA"). The user may hold a conversation with the VPA to perform functions such as ordering goods or services, managing financial accounts, receiving contextual offers, etc.

With reference to FIG. 1, a contextual services ecosystem manager 2 may operate within a context environment 22. A context environment 22 may comprise any characteristic of one or more user, merchant, surrounding geography, surrounding business environment, item or any other factor or characteristic related to an interaction or potential interaction between a user and a merchant. Various aspects of the contextual services ecosystem manager 2 may acquire awareness of the context environment 22 through a variety of inputs. For instance, the system may acquire data from internal databases (e.g., internal data), external databases, credit card processors, merchant databases, a user's mobile device, point of sale machines, SKU data, store mapping data, cardmember data from internal databases, social media, and other sources. The data may include big data, which may be organized and managed, as set forth herein.

A context environment 22 may include the location of one or more user devices 4, such as a first user device 4-1, a VPA 4-2, and any number 'n" of user devices 4, such as a $N^{th}$ user device 4-n. A context environment 22 may include whether a user is located at a POS terminal, whether a user is traveling toward or away from a store, whether a user is inside or outside a store, whether a user has just entered a store, whether a user is visiting an online store, and/or a user's general or specific location, direction of travel, web history, and behavior. The context environment 22 may include a user payment status (e.g., whether a user has swiped a payment card, authorized a payment on a user device 4, entered payment information on user device 4, submitted payment information on user device 4), may include whether a user has opened an application on a user device 4, may include whether a user has scanned a product SKU, may include whether a user has added a product to an online cart, and/or any other information regarding the actions of a user. The context environment 22 comprises any characteristic related to the user, and/or historical information, and may include a past transaction by the user, products of interest as indicated by the user, and/or a potential future transaction by the user. Some or all of the context environment 22 data may be stored in the user data repository 16.

Thus, a context environment 22 may include any detail, fact, historical information, item information and/or predicted future behavior of a user. A context environment 22 may include information related to one or more user devices 4, such as transactions entered, searches performed, communication bandwidth, internet history, geodata, BLE ("Bluetooth Low Energy") activities, travel direction, travel speed, frequently visited locations or web sites, and any other information related to one or more user device 4.

A context environment 22 may comprise any characteristic of one or more merchant including the location of one or more merchant having a merchant device 24. For example, a first merchant device 24-1, a second merchant device 24-2, and any number "n" of merchant devices 24, such as a $N^{th}$ merchant device 24 may be associated with any number of merchants. A context environment 22 may include inventory data, which may be stored in merchant inventory data repository 18, and may include data on what types of users a merchant seeks to engage with, the types of engagement sought for different users or types of users, individual users the merchant seeks to engage with, or any other merchant targeting data which may be stored in a merchant targeting data repository 20.

In various embodiments, and with reference to FIG. 1, a contextual services ecosystem manager 2 may comprise a merchant device 24, a user device 4, a network 26, and a contextual services management system 7. The contextual services management system 7 may comprise a user data repository 16, a merchant inventory data repository 18, a contextual services repository 19, a merchant targeting data repository 20, and a contextual services ecosystem manager 6.

User device 4 may be in communication with and/or operatively coupled to (e.g., in "logical communication" with) contextual services management system 7 via first network 26-1. Similarly, merchant device 24 may be in communication with and/or operatively coupled to contextual services management system 7 via second network 26-2. In various embodiments, first network 26-1 and second network 26-2 are portions of the same larger network, although in other embodiments, first network 26-1 and second network 26-2 are discrete networks. For example, if contextual services management system 7 is located at the boundary of a proprietary intranet, the first network 26-1 may comprise the internet, and the second network 26-2 may comprise a proprietary intranet.

Network 26 may be any suitable communication network, such as the Internet, and may comprise one or more payment network including, for example, the Internet, the American Express® Network, the Visa® network, the MasterCard® network, the Discover® card network, and/or the like. In this regard, network 26 may be configured to receive communications from merchant device 24 and/or user device 4, and/or an entity capable of gathering data from merchant device 24 and/or user device 4. Moreover, network 26 may be configured to facilitate the communications from merchant device 24 and/or user device 4 to the contextual services management system 7 in substantially real time. In this regard, network 26 may be capable of and/or configured to facilitate an authorization of a transaction initiated at merchant device 24 and/or user device 4. In various embodiments, network 26 may include at least a portion of merchant device 24 and/or user device 4 and/or contextual services management system 7, or at least a portion of the functions of merchant device 24 and/or user device 4 and/or contextual services management system 7.

Phrases similar to a "contextual services system" (e.g., "contextual services management system 7," or "CSCS") may include a company (e.g., a third party) appointed (e.g., by a merchant) to handle transactions (a "payment processor"). A payment processor may include an issuer, acquirer, authorizer, network 26 and/or any other system or entity involved in the transaction process, and/or at least a portion of the functions of such entities. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will complete the payment transaction. In response to the verification being denied, the payment processor relays the information to the merchant, who may decline the transaction.

Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

In various embodiments, a user may interact with user device 4, network 26, and/or a merchant device 24. For example, a user may interact with merchant device 24 and/or user device 4 (e.g., a merchant, a website, an app, a virtual point of sale, a physical point of sale, an iPad® having an installed app, a VPA and/or the like) to initiate a transaction. Similarly, a user may interact with user device 4, network 26, and/or a merchant device 24 to initiate a transaction. Moreover, a user may interact with a user device 4, network 26, and/or a merchant device 24 to chat with a merchant, to search for a merchant, to search for a product, to receive offers, promotions, or upsell opportunities, to settle a transaction, fund a transaction, or otherwise communicate with the contextual services management system 7, or otherwise communicate with a merchant via a merchant device 24, and/or the like.

In various embodiments, a user may interact with a contextual services management system 7 by registering with a payment processor, or network 26, or the contextual services ecosystem manager 6. Registration may in various embodiments satisfy regulatory "opt-in" requirements. In further embodiments, registration may allow the system to tailor the user experience, whether in real time during user interactions, or in the background before or after user interactions. In operation, payment processor or network 26 or the contextual services ecosystem manager 6 may be capable and/or configured to facilitate authorization and/or settlement of transactions by analyzing information from user device 4 and/or merchant device 24, as well as other information available at the contextual services ecosystem manager 6. However, networks may not be capable of and/or configured to monitor, track, record, and/or count the number of transactions associated with a particular user. Moreover, the transaction information communicated between a point of sale and payment processor may not be sufficient to particularly identify a user by a network.

In various embodiments, contextual services management system 7, contextual services ecosystem manager 6 and/or network 26 may be capable of providing a contextual services experience. In this manner, the contextual services management system 7 provides a contextual experience to users. For simplicity, the disclosure will discuss operations by contextual services management system 7, but one skilled in the art will appreciate that network 26 may perform one or more of the functions.

In various embodiments and with continuing reference to FIG. 1, a merchant device 24 may comprise a computer, a server, a tablet, for example, an iPad®, a terminal, or any other device or system whereby a transaction may be initiated, or communications may be initiated. For example, a merchant device 24 may comprise any device, interface, or merchant, a website, an app, a virtual point of sale, or a physical point of sale. A merchant device 24 may have various different input and output capabilities. For example, a merchant device 24 may comprise a plain-text display, may comprise a graphical display, or may comprise a rich audio-visual user interaction mechanism.

A merchant device 24 may comprise a portable device whereby a merchant may interact with the contextual services management system 7. For example, a merchant device 24 may comprise a phone, a tablet, for example, an iPad®, a laptop, or any other suitable electronic device. In various embodiments, a merchant device 24 comprises an iPhone®, a Blackberry®, a device running an Android® operating system, a Nokia® phone, a Windows® phone, or any other data access and/or telephony device.

A user device 4 may comprise a VPA 4-2, a computer, a tablet, for example, an iPad®, a terminal, a smartphone, or any other device or system whereby a transaction may be initiated, or communications may be initiated. For example, a user device 4 may comprise any device and/or interface such as, for example, a web browser, an app, a virtual point of sale, or a physical point of sale. A user device 4 may have various input and output capabilities. For example, a user device 4 may comprise a plain-text display, a graphical display, or a rich audio-visual user interaction mechanism.

A VPA 4-2 may comprise a stand-alone device capable of speech recognition, such as AMAZON ECHO™, also referred to as ALEXA™. The VPA 4-2 may comprise a microphone, a speaker, a processor, and a wireless chip. In various embodiments, the VPA 4-2 may comprise an application installed on a smartphone or other device. A user may speak a wake word, and the VPA 4-2 may detect the wake word and initiate streaming with a web services cloud computing network 5, such as Amazon® Web Services. In various embodiments, the VPA 4-2 may communicate wirelessly with a wireless router, and the wireless router may connect to the cloud computing network 5. The user may speak to the VPA 4-2, and the VPA 4-2 may stream the user's voice to the cloud computing network 5. The cloud computing network 5 may recognize the words spoken by the user, and may transmit an appropriate response to the VPA 4-2, which may broadcast the response to the user over a speaker.

A user device 4 may comprise a portable device whereby a user may interact with the contextual services management system 7. For example, a user device 4 may comprise a phone, a tablet, for example, an iPad®, a laptop, or any other suitable electronic device. In various embodiments, a user device 4 comprises an iPhone®, a Blackberry®, a device running an Android® operating system, a Windows® phone, or any other data access and/or telephony device.

Finally, as mentioned previously, a contextual services ecosystem manager 2 may comprise a contextual services management system 7 configured to establish connectivity between a user device 4 and a merchant device 24, between different user devices 4, between different merchant devices 24, and between groups of user devices 4 and merchant devices 24, as well as deliver a contextual services experience to a user and/or merchant via a user device 4 and/or a merchant device 24. Also, as previously mentioned, the contextual services management system 7 may comprise a user data repository 16, a merchant inventory data repository 18, a contextual services repository 19, a merchant targeting data repository 20, and a contextual services ecosystem manager 6. A contextual services ecosystem manager 6 may identify a context environment 22 and may deliver a contextual services experience comprising contextual services from contextual services repository 19 to a user device 4 and/or a merchant device 24, in response to a context environment 22, and/or in response to past context environments 22, and in accordance with various methods.

A contextual services repository 19 may communicate with the contextual services ecosystem manager 6. The contextual services repository 19 may comprise a database containing contextual services comprising instructions which, when executed by the contextual services ecosystem manager 6, cause the contextual services ecosystem manager 6 to deliver various different contextual services experiences to a user device 4 and/or a merchant device 24. A contextual services experience may comprise any combination of contextual services. A contextual services repository 19 may comprise contextual services including conversation services, transaction services, display services, and authentication services. In this manner, a user's interactions with a user device 4 and/or a merchant device 24 may be customized and a user may be able to access the merchant, the merchant's personnel, the merchant's inventory, and the like, without having to enter the merchant's store. For example, various contextual services may be delivered from a contextual services repository 19 and to a user device 4 and/or a merchant device 24, such as via a restful application programming interface (API), or an app, or via various mechanisms.

A merchant targeting data repository 20 may comprise a public or private database of information provided by a merchant. For example, a merchant may wish to provide various types of users with various contextual services experiences. The merchant targeting data repository 20 may comprise instructions ("contextual directives") indicating which users (which may be associated with user device(s) 4) have desired characteristics ("targeting factors"), in response to different context environments 22. The targeting factors may derive from various data, such as inventory, spreadsheet data, iBeacon data, SKU data, timed offers, SKU based offers, personally identifying information, and the like. The merchant targeting data repository 20 may be in electronic and/or logical communication with the contextual services ecosystem manager 6. Thus, the merchant targeting data repository 20 may be said to contain records of linkages between different context characteristics (of the context environment 22) and different targeting factors and may be accessed by the contextual services ecosystem manager 6, for example, in order to determine which contextual services experience to provide in response to different context environments 22 and/or data in the user data repository 16.

Moreover, the contextual services experience may be delivered in real time or substantially real time. For instance, the contextual services experience may be delivered in response to a present context environment 22. Furthermore, the directive may comprise dynamic instructions to deliver a contextual services experience in response to a present context environment 22 with consideration for past context environments 22, past contextual services delivered, and/or past consumer responses, for example, whether a consumer entered a transaction, accepted/rejected an offer, searched for a merchant, communicated with a merchant, entered the store of a merchant, and the like. Thus, the merchant targeting data repository 20 may comprise contextual directives comprising machine learning instructions. Similarly, the context environment 22 may be said to be path-dependent, for example, it may account for previous context environments 22 and/or consumer behaviors.

A user data repository 16 may comprise a public or private repository of information provided by various sources about one or more user of one or more user device 4. A user data repository 16 may comprise stored contextual context characteristics. For example, a user data repository 16 may comprise information provided by third parties such as merchants, social media, credit reporting agencies, payment processors, and internal data (e.g., risk analysis, analytics, name of stores visited by different users, transaction history and other data as set forth herein). The user data repository 16 may comprise context characteristics, such as transactions, and data regarding transactions (e.g., location, date, and time of transaction), present location, past location, proximity sensing data, such as iBeacon® data, amount spent, merchant, frequency of transactions, number of transactions, transaction categorizations, searches, interests, interactions with merchants, travel patterns, search patterns, and the like.

User data repository 16 may also include user permissions to restrict the sharing of information stored in user data repository 16. Users may select permissions for the distribution of their data. Permissions may be categorized into categories such as history with merchant, spend history, history in market segment, interests, location history, user objectives, etc. to give users control over which data is shared with various merchants. The permissions may be applied to individual merchants, segments of merchants, user defined groups of merchants, predefined groups of merchants, historically visited merchants, or any other suitable way of applying access permission to merchants.

For example, context characteristics may comprise an activity in a social media channel (e.g., a Tweet). Examples of social media channels include Facebook®, Foursquare®, Twitter®, MySpace®, LinkedIn®, and the like. In response to activity in the social media channel, various context characteristics may be stored, for example, an individual's comments in a social media channel toward a particular retailer. For example, an individual who comments about retailers in a particular market segment may be of interest to other retailers in that same market segment, and thus this activity may be of interest to store as context characteristics.

Similarly, context characteristics may comprise an activity in an entertainment channel (e.g., xBox®) or a review channel (e.g., TripAdvisor®), or activity in a reservation channel (e.g., OpenTable®), or may comprise any activity or combination of activities.

Moreover, contextual services, such as conversation services may be delivered via a social media channel. For example, a user may be identified via social medial behavior, a user may be observed via a social media channel, a user interaction with a merchant may transpire via a social media channel. For instance, a user may be invited to "check in" at a location on a social media platform to receive a discount. The user may receive a message or pop-up display when in the area of a merchant. Users may be requested by a merchant to take a virtual act in a social media channel, such as click a "like" button, or the user may be requested by a merchant to take a real-world act such as enter a store, via a social media channel.

Some or all of the information comprising a context environment 22 may be stored in the user data repository 16 for access by the contextual services ecosystem manager 6. It may also be said that some or all of the information comprising a context environment 22 may be provided by a user device 4 and/or a merchant device 24 and stored in the user data repository 16. The user data repository 16 may communicate with the contextual services ecosystem manager 6. Thus, the contextual services ecosystem manager 6 may access the user data repository 16 to identify different context characteristics in order to provide various types of users with various contextual services (and thus various contextual services experiences).

A contextual services ecosystem manager 2 may operate within a context environment 22. A context environment 22 comprises various potential triggers (e.g., user location, proximity sensing data, such as iBeacon® data, payment status, transaction, past user behavior, past context environments 22, past contextual services delivered to a user, past contextual services ecosystem manager 2 operations of any sort, past user behavior following the delivery of past contextual services, past user behavior following the delivery of past contextual services in view of past context environments 22, and the like) that, upon detection, trigger the contextual services ecosystem manager 2 to execute various methods.

Thus, the contextual services management system 7 may manage the logical connectivity between a user device 4 and a merchant device 24 in response to processing by a contextual services ecosystem manager 6. This managing may include delivering contextual services from a contextual services repository 19, to a user device 4 and/or a merchant device 24, in response to processing by a contextual services ecosystem manager 6, wherein context characteristics from a contextual services repository 19 are assessed in comparison to a merchant targeting data repository 20. In response to a context environment 22 triggering the contextual services management system 7 to deliver contextual services, the contextual services management system 7 may determine a correspondence between data from the contextual services repository 19 with an instruction from a merchant targeting data repository 20 corresponding to this data and directing the provision of various services. Thus, the contextual services ecosystem manager 6 may provide various services to the user device 4 and/or the merchant device 24.

In further embodiments, the contextual services management system 7 may deliver contextual services based on a determined correspondence which incorporates and/or is responsive to machine learning connectivity directives as previously discussed. For example, the correspondence may account for past context environments 22, past contextual services from a contextual services repository 19 delivered by the contextual services management system 7, external data, such as past consumer purchases or past consumer social media posts, and/or past consumer interactions with the contextual services ecosystem manager 2, and the like.

Similarly, such managing may include delivering merchant inventory data from a merchant inventory data repository 18 to a user device 4 in response to a processing by a contextual services ecosystem manager 6, wherein data representative of the inventory of a merchant associated with a merchant device 24 in logical connection with a user device 4 may be retrieved by the contextual services ecosystem manager 6 and delivered to the user device 4. In response to a context environment 22 triggering the contextual services management system 7 to deliver contextual services comprising inventory data, the contextual services management system 7 may determine a correspondence between data from the merchant inventory data repository 18 with an merchant in connectivity with a user device 4, or from a merchant not in connectivity with a user device 4, for example, in response to a user query requesting that a nearby merchant with certain items in inventory be identified.

Thus, one may appreciate that the contextual services management system 7 and/or any other component of the contextual services ecosystem manager 2 may implement machine learning techniques, for example, supervised learning techniques, and/or unsupervised learning techniques. In this manner, the contextual services ecosystem manager 2 may dynamically respond to context environments 22 and may respond differently to different consumers, or differently to a given consumer in a given context environment 22 in view of that consumer's changing behavior and/or past behavior, purchases, social media posts, etc. Thus the contextual services management system 7 may deliver contextual services from a contextual services repository 19 to user device 4 and/or a merchant device 24, in response to processing by a contextual services ecosystem manager 6, wherein the processing includes machine learning algorithms and also accounts for past consumer behavior and contextual services ecosystem manager 2 behavior. As such, the contextual services delivered may be tailored to each context environment 22, accounting for historical data and performance. The contextual services management system 7 may determine a correspondence between data from the user data repository 16 with an instruction from a merchant targeting data repository 20 corresponding to this data and directing the provision of various services. As such, a feedback loop may be established among consumer behavior, the response of the contextual services ecosystem manager 6 in selecting contextual services from a contextual services repository 19 for delivery in response to a present context environment 22 and the data stored in the user data repository 16, merchant inventory data repository 18, and/or other sources of data, including historical data.

For example, a consumer who has previously traveled from a frequently visited location (e.g., home) toward a merchant's store may be provided with inventory data from that specific store whenever he or she enters a query on a user device 4 seeking a specific item that is in stock at that, and other stores. Thus, the user may be provided with contextual services tailored to that user.

Furthermore, as discussed further herein, a contextual services repository 19 may comprise contextual services including conversation services. For example, conversation services may be instantiated between the user and the merchant. The conversation services may comprise permitting the user to converse with the merchant (e.g., a text chat between the merchant and user, or a voice chat using a VPA), receive offers from the merchant tailored to the user, put items on hold for pickup, and the like.

Moreover, when the consumer enters the store, this change in the context environment 22 may be detected by the contextual services ecosystem manager 6 and additional contextual services may become available. Exemplary processes and systems disclosed in U.S. patent application Ser. No. 14/318,091, SYSTEM AND METHOD FOR CONNECTIVITY CONTEXTUAL SERVICES EXPERIENCE are incorporated by reference in its entirety for all purposes.

The contextual services management system 7 may consider, for example, available products, social media activity, such as Facebook® activity and/or Twitter® activity, activity of other users, activity of other merchants, activity of the instant user, activity of an instant merchant, American Express® internal data, SKU data, sentimental analysis of data such as social media activity to determine individual or collective sentiments regarding products and/or merchants, etc., and may determine contextual services to delivery to a user. Moreover, different contextual services may be ranked for a user in view of user behavior, American Express® internal data, and merchant targeting data repository 20 data, and may be delivered based on different context environments 22 according to machine learning processes as discussed.

With renewed focus on contextual services repository 19, contextual services repository 19 may comprise contextual services comprising transactional services, conversation services, display services, and authentication services. In this manner, a user's interactions with a user device 4 and/or a merchant device 24 may be customized. Moreover, these interactions may be customized in real time or substantially real time, e.g., they may be customized as (or close to when) they occur.

Contextual services may comprise conversation services as discussed. In further embodiments, conversation services may include two-way real-time communication, such as real-time chat between a user and a merchant or merchant's employee, two-way non-real-time communication, such as the delivery of stored messages or pre-programmed messages, and one-way communication, both real-time and non-real-time, such as automated messages, advertisements, user instructions to the merchant, and merchant instructions to the user. Conversation services may be instantiated between users ("user-to-user"), between merchants ("merchant-to-merchant") or between groups involving one or more user and/or one or more merchant. The conversation services may comprise permitting the user to converse with the merchant, receive offers from the merchant tailored to the user, put items on hold for pickup, and the like.

Contextual services may comprise transactional services. Transactional services may include the delivery of information regarding available inventory, the sale of an item, an offer to sell an item, an offer to sell a related and/or complementary good or service, an offer to sell a competing good or service, an proposed discount, the identification of a user's location and the delivery of other transactional services in response thereto (e.g., the identification of a user's location by triangulation and/or iBeacon® systems, and or proximity sensing data), Bluetooth low energy communication systems, GPS systems, near-field communication systems, the invitation to purchase a warranty, and/or tracking of SKUs purchased or considered for purchase.

In various embodiments, different contextual services may be available depending on the technical capabilities of a user device 4 and/or a merchant device 24. For example, a user whose user device 4 permits video chatting may receive audio-visual conversation services, whereas a user whose user device 4 permits only text chatting may receive text conversation services.

Different contextual services may be available depending on the location of a user device 4 and/or a merchant device 24. For instance, a user whose location is identified as being at a merchant device 24 may receive real-time updates targeted to the individual and/or in view of a context environment 22. For example, a user whose location is identified as being at a merchant device 24 may receive real-time updates (of purchased products, complementary products, upsell products, product information, etc.) displayed on the user device 4 as a store clerk scans the items being purchased, whereas a user whose location is identified as being at a remote location may receive contextual services comprising requesting items be shipped to that user's location.

Further, different contextual services may be available depending on a change in location of a user device 4 and/or a merchant device 24. For example, a user identified as traveling toward a store, or located within a certain distance (for example, an hour's journey) of the store may be enabled to place the item on hold for pickup, whereas a user identified as being located outside a certain distance (for example, a day's journey) of the store, may be prevented from placing items on hold, but may be permitted to access conversation services instead, speaking directly with the merchant and inquiring about long-term availability of the item.

Similarly, the contextual services may comprise display services. Display services may include a textual information presentation, a graphical information presentation, an invitation to determine an item for purchase via a user device 4 and/or a merchant device 24, an invitation to complete a transaction via a user device 4 and/or a merchant device 24, and/or an invitation to complete a transaction via a point-of sale terminal. In various embodiments, different contextual services may be available depending on the technical capabilities, location, and/or change in location of a user device 4 and/or a merchant device 24. For example, a merchant device 24 lacking a sound output may flash a light when a user device 4 is nearby, whereas a merchant device 24 having a sound output may play a chime when a user device 4 is nearby.

Furthermore, the contextual services may comprise authentication services. In various embodiments, authentication services comprise various mechanisms whereby an action is approved by a user and the identity of the user is confirmed. For example, authentication services may comprise biometric authentication (e.g., voice recognition or fingerprint information), payment card swipe, entry of a pin number, identification of a photograph, and/or identification of a user by that user's location. For example, a user may be authenticated by the user device 4 being located at a location, or traveling on a path known to be associated with a particular user. In various embodiments, a user may be authenticated by identification of a user by that user's location, wherein the location of the user device 4 is determined to be inside a merchant's store, and the available context services updated by the contextual services ecosystem manager 6 according to various systems and processes such as those disclosed in U.S. patent application Ser. No. 14/318,091, SYSTEM AND METHOD FOR CONNECTIVITY CONTEXTUAL SERVICES EXPERIENCE, which is incorporated by reference.

Authentication services may further enable the contextual services ecosystem manager 6 to identify users (associated with data in the user data repository 16) that are interacting with user devices 4, and direct connections between merchants and users accordingly.

Moreover, the contextual services may comprise connectivity services. In various embodiments, connectivity services may include enabling a user to search for a provider of a desired product and begin interacting with a merchant device 24 located at that provider, enabling a user to search an identified provider for desired products and begin interacting with a merchant device 24 located at that provider, or any other connection between the user device 4 and the merchant device 24 so that the user and merchant may interact even before the user enters the merchant's store.

In various embodiments, contextual services management system 7 may be able to particularly identify and/or associate one or more transactions with a particular user. Moreover, information provided by a user may be used by contextual services management system 7 to particularly identify transactions routed between POS terminals, merchant devices 24, or user devices 4, and the contextual services management system 7 by network 26.

The contextual services management system 7 may be able to identify a customer upon his or her entry into a store. In this manner, the contextual services management system 7 may open an in-store session with the user, such as according to various systems and processes such as those disclosed in U.S. patent application Ser. No. 14/318,091, SYSTEM AND METHOD FOR CONNECTIVITY CONTEXTUAL SERVICES EXPERIENCE, which is incorporated by reference.

Figure 2:
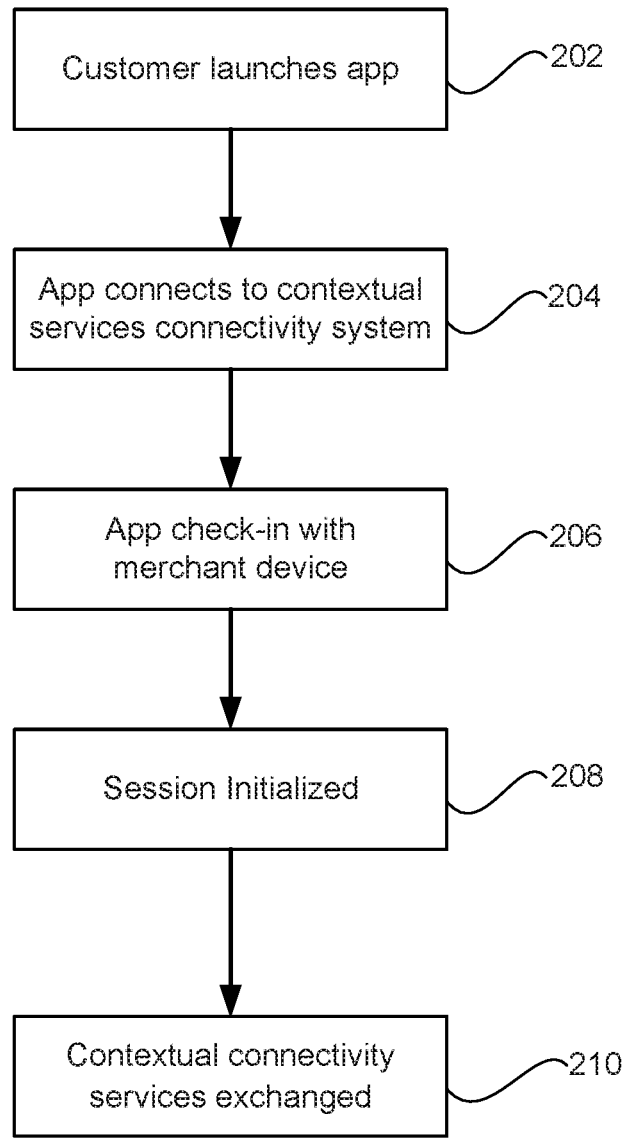
FIG. 2 illustrates a process flow for initializing a user session for delivering services, in accordance with various embodiments.

With reference to FIG. 2, the contextual services management system 7 may be able to identify a customer based on activity outside a store. In this manner, the contextual services management system 7 may open an out-of-store session with a user. A method of instantiating an out-of-store user session 200 may include a customer launching an application on a user device 4 (Step 202) and/or logging into an application on a user device. The application on the user's user device 4 may logically connect to a contextual services management system 7, such as by Bluetooth Low Energy ("BLE") communication, by cellular communication, by Wi-Fi communication, by Near-Field Communication ("NFC"), or by any IEEE 802 standard communications technology (Step 204). Subsequently, the contextual services management system 7 may enable the application to communicate with one or more merchant device 24, identify itself and thus may be said to "check-in" with the merchant device 24 (Step 206). An out-of-store session is subsequently established between the merchant device 24 and the user device 4, wherein each is aware of the other's presence and information, such that contextual services may be exchanged (Step 208). Thereafter, contextual services are exchanged (Step 210). For instance, in various embodiments, a subset or all of a store's inventory data may optionally be displayed on the user device 4.

Such inventory data may be searchable, provide comparisons to other inventories, associate items, determine complementary items, analyze competing items, etc. The user may be further permitted to pay for items, ship items, may be directed to a store having the items and/or a location within the store where the items are located, and/or to direct that items be held for in-store pickup. Furthermore, any additional contextual services, as discussed herein may be delivered to the user. As a result, an online presence may be provided for a store that otherwise would lack a website or online purchasing and/or inventory searching mechanisms.

Moreover, in further embodiments, such data, as well as any functionality or features of the methods and systems disclosed herein may be delivered to a user via network 26 regardless of that user's location. For example, a user may be permitted access to inventory data via a user device 4, and/or a web browser, regardless of whether the user is physically in the store.

Figure 3:
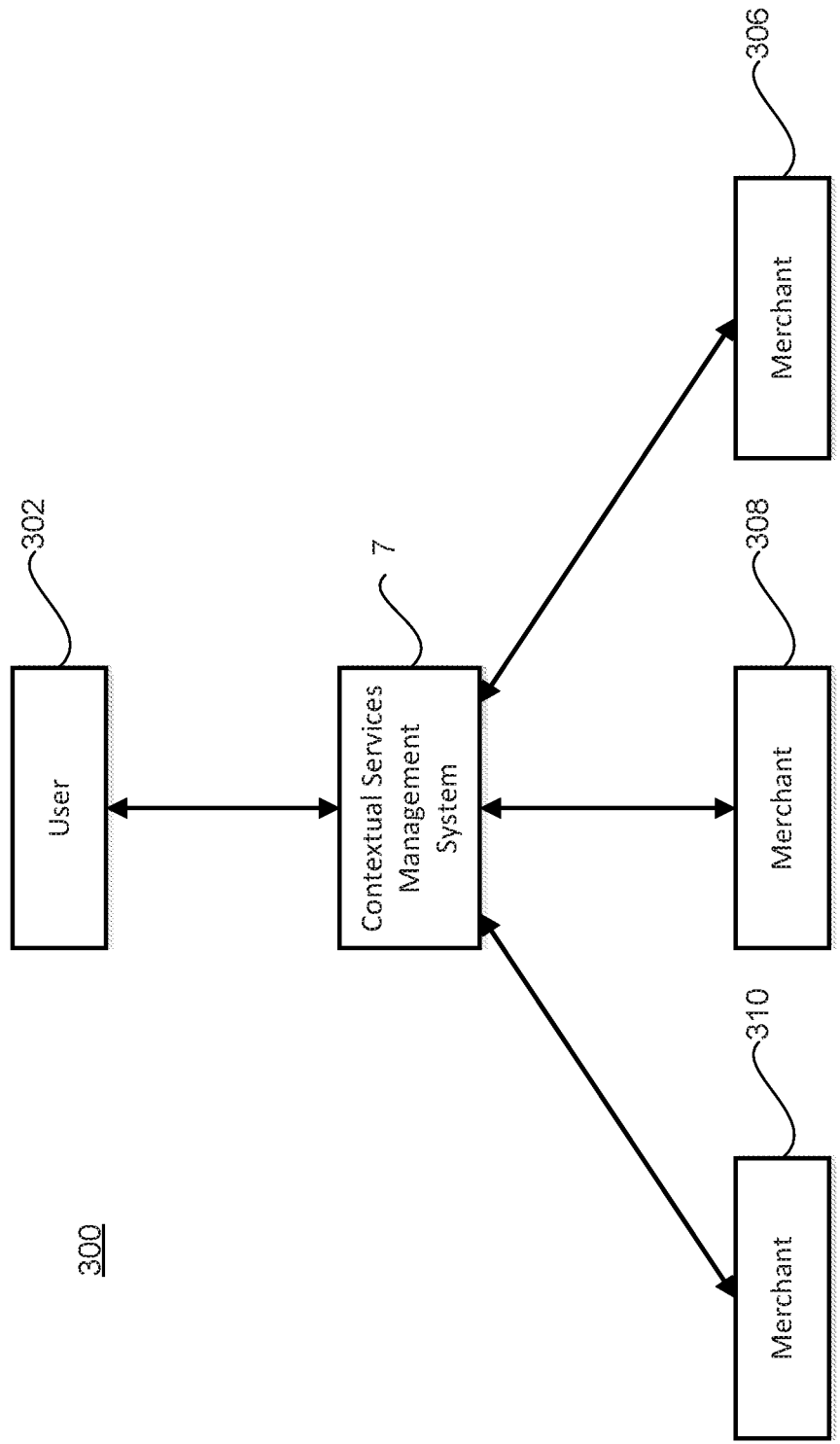
FIG. 3 illustrates a contextual services system for providing contextual services to a user, in accordance with various embodiments.

With reference to FIG. 3, a contextual services system 300 is shown in which the identified entities may interact using the various devices and components of contextual services ecosystem manager 2 of FIG. 1, in accordance with various embodiments. In various embodiments, user 302 may be in electronic communication with contextual services management system 7. User 302 may interact with a user device 4 (of FIG. 1) to communicate with contextual services management system 304. Merchant 306, merchant 308, and merchant 310 may each interact with contextual services management system 7 via one or more merchant devices 25 (of FIG. 1). A user may thus log in to contextual services system 300 and authenticate with contextual services management system 7. Contextual services management system 7 may establish a new session or load a previously created session for the user 302.

The user session may be associated with a persona of the user. The user persona may include user characteristics including demographics (e.g., age and gender), purchase history, user information (e.g., address, email, and telephone number), or other known data regarding user 302. The user may control merchant access to their persona data by setting permissions for the merchants, as described above. User 302 may thus selectively share their persona data and other session data with merchants.

The user may also access sub-personas. A sub persona may include a persona of a user other than user 302 that has given permission to user 302 to access their persona. Thus, a sub-persona may give a friend or family member insight into the user associated with the sub-persona. For example, user 302 may access his wife's sub-persona to identify a suitable gift for his wife. A sub-persona may be connected to user 302 by way of being a persona on the same account. A sub-persona may also be connected to user 302 by the owner of the sub-persona granting access to user 302. User 302 may have separate log-in credentials to access a sub-persona.

In various embodiments, each merchant may have access to varying information related to user 302 based on permissions, preferences, and controls set by user 302. User 302 may set user permissions to restrict the sharing of information (stored in user data repository 16 of FIG. 1). In that regard, users may selectively share their data with merchants. Users thus control their privacy settings to allow individual merchants to access data ranging from full access to limited access, to no access. Permissions may be separated based on categories such as, for example, history with merchant, spend history, history in market segment, interests, location history, user objectives, etc. to give users control over which data is shared with various merchants. The permissions may be applied to individual merchants, segments of merchants, user defined groups of merchants, predefined groups of merchants, historically visited merchants, or any other suitable way of applying access permission to merchants.

For example, user 302 may set permissions for merchant 306 to have access to all available data on user 302 maintained by contextual services management system 7. However, user 302 may set permissions for merchant 310 to have no access to any user data maintained by contextual services management system 7. User 302 may also set permissions for merchant 308 to have limited access to user data maintained by contextual services management system 7. In that regard, user 302 may selectively control their contextual services experience by restricting and/or allowing merchants access to their user data on a merchant-by-merchant basis. Users may thus control the contextual experience by dictating what data is available to merchants for customization.

In various embodiments, merchant 310, merchant 308, and merchant 306 may each be in electronic communication with contextual services management system 7. In various embodiments, the electronic communication may take the form of API calls, HTTP communication, shared tables, web services, or other suitable forms of electronic communication. An API may be a set of functions and protocols provided to merchants and application developers for interfacing with contextual services management system 7. In that regard, merchants and third parties may generate applications that provide contextual services to users such as user 302.

Permissions may be applied to the merchants at the API call level. For example, merchants may register with contextual services management system 7 in order to have access to the API interfaces provided by contextual services management system 7. Each registered merchant may have an associated unique identifier. For example, merchant 306 may be assigned the identifier 000000000001, merchant 308 may be assigned the merchant identifier 000000000002, and so on. Any combination of characters may be used as a merchant identifier and the integral numbers above are provided solely as an example. Contextual services management system 7 may also use tokens, aliases, or any other suitable forms of identification to interact with a merchant. The merchant identifier may also be obfuscated from the public and/or the merchant by, for example, assigning a different identifier for each session to the merchant, and matching that assigned identifier with a permanent merchant identifier in a lookup table. The merchant identifier may have permissions assigned by the user associated with it.

For example, user 302 may be shown a list of merchants including merchant 310, merchant 308, and merchant 306. The names of each merchant may be displayed to the user via a user device 4 (of FIG. 1). The user may assign access permissions to the merchants as desired, with a default permission being applied in the absence of directly entered user permissions. The permissions for each merchant may default to no access. The permissions that a user enters for a given merchant may be stored in a database or other data structure with the merchant identifier serving as a key. In that regard, the access permissions for a particular merchant may be retrieved and applied by contextual services management system 7 as API calls are made by that particular merchant.

Merchants and/or third parties registered with contextual services management system 7 to provide contextual services may provide applications for execution on user devices 4. Merchants and/or third parties registered with contextual services management system 7 to provide contextual services may also provide back end support for applications by writing server-side applications (to run on merchant devices 24 of FIG. 1) to support applications. Contextual services management system 7 may also provide contextual services to users such as, for example, an online interface to compare products saved from various merchant web sites.

Figure 4:
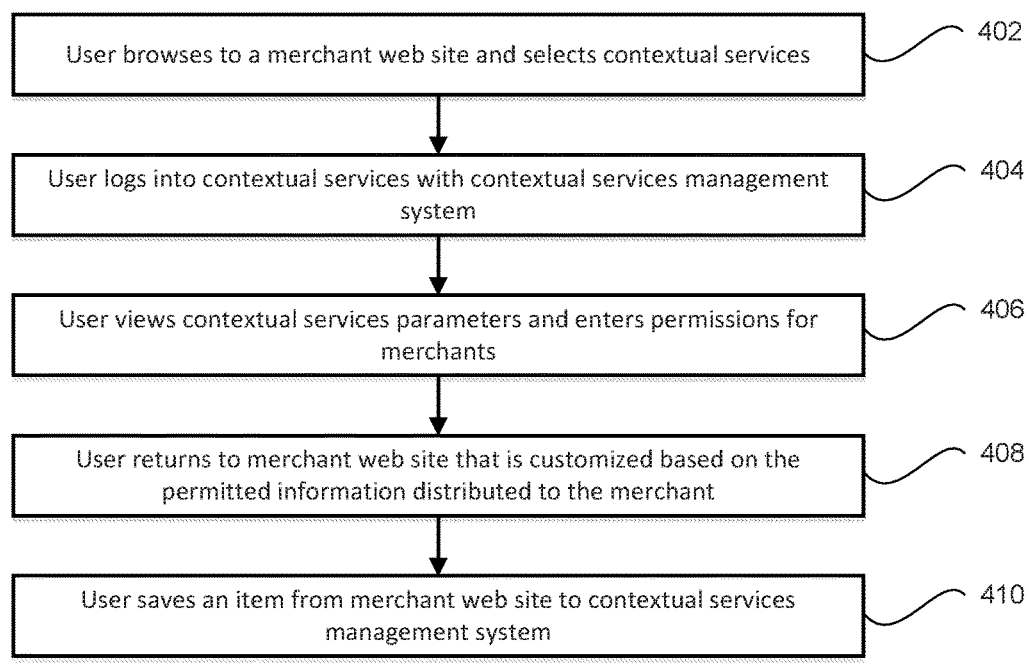
FIG. 4 illustrates a process for providing a user web-based contextual services by applying access permissions to merchants, in accordance with various embodiments.

Referring now to FIG. 4, an exemplary process 400 for providing contextual services to user 302 based on an online interaction is shown, in accordance with various embodiments. User 302 may browse to a merchant web site and select contextual services (Step 402). The merchant website may be maintained, for example, by merchant 306 using a merchant device 24. The user may be redirected to a login interface to authenticate with contextual services management system 7.

In various embodiments, user 302 may log into contextual services with contextual services management system 7 (Step 404). The user may log in by providing a user name and password for authentication by contextual services management system. The user may also authenticate with contextual services management system 7 by providing one or more of a one-time password (OTP), a fingerprint, a facial image, or another suitable user authentication data. The user may also be authenticated with contextual services management system 7 using device authentication based on unique identifiers for user device 4 of user 302 such as, for example, device ID, MAC address, telephone number, or other device identifiers. Contextual services management system 7 by verifying that merchant 306 has performed suitable user authentication.

In various embodiments, user 302 may view contextual services parameters and enter permissions for merchants (Step 406). The user may assign access permissions for merchants as desired to limit merchant access to his or her data. The permissions that a user enters for a given merchant may be stored in a database or other data structure in contextual services repository 19 with the merchant identifier serving as a key. Permissions may be provided for merchants to restrict or grant access to user data such as, for example, spend history, shopping patterns, gender, age, identified objectives, merchant history, or other user data that user 302 may place access permissions on. User 302 may also provide blanket permissions for a merchant or group of merchants. For example, merchant 306 may be white listed by user 302 and given access to all data related to user 302 and maintained by contextual services management system 7. User 302 may also blacklist merchant 310 and thereby restrict merchant 310 from receiving any user date associated with user 302 and maintained by contextual services management system 7.

In various embodiments, user 302 may return to the merchant web site that is customized based on the user information and permitted information distributed to merchant 306 (Step 408). The customized merchant web site may be tailored to user 302 based on information retrieved by merchant 306 using an API to interface with contextual services management system 7. For example, merchant 306 may retrieve a permitted user objective that indicates user 302 is presently shopping for a jacket and is a 30 year old male. The merchant web page may automatically display to user 302 a list of jackets commonly purchased in the user's demographic of 30 year old males.

In various embodiments, the merchant may customize the merchant web site for user 302 in a variety of ways. The merchant web site may display a specific product type or product category. The merchant web site may also sort displayed products according to a user preference such as, for example, popularity with users generally, popularity with a user segment, ascending price, or descending price. The merchant web site may also tailor the look and feel to the user based on user preferences. For example, the user may provide contextual services management system 7 with web preferences such as color, text size, image size, items per page, or other browsing preferences. Merchant 306 may retrieve the preferences as permitted by user defined permissions and apply the preferences when serving content to user 302. The merchant may decide how to customize the contextual experience for user 302 based at least in part on the information on user 302 retrieved from contextual services management system 7.

In various embodiments, the user may interact with the contextual services using an extended set of features supported by contextual services management system 7 and/or merchant 306. User 302 may save an item from the merchant web site to contextual services management system 7 (Step 410). Item information may be stored by contextual services management system 7 and/or merchant 306 for further use in association with user 302 and the persona of user 302. For example, context of the item and the item may be stored by contextual services management system 7. Context may include the date and time of the web interaction, the merchant web site visited, an item identifier associated with the item, or other suitable context. The context may be provided to other merchants for which user 302 has granted permission. The context may also be used by merchant 306 in future interactions with user 302.

In various embodiments, the context may learn and grow over time and may be modified by user 302. For example, as the user's characteristics and the user's persona changes over time those changes may be integrated into the context. For example, the user may purchase new shoes once a year based on their past transaction history. Thus, the context may grow to include a predicted shoe purchase for the user once a year. The user may control the data available to the intelligence layer by specifying permissions and preferences similar to those described above. Thus, the context may be limited to learning from data that the user has approved. The context may also grow by integrating data from outside the closed-loop transaction system. For example, the context may include data acquired from third-party data services.

Figure 5:
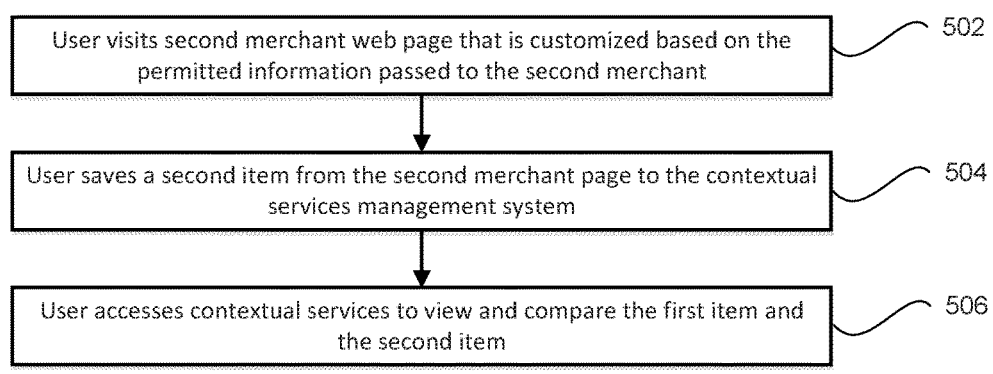
FIG. 5 illustrates a process for providing web-based contextual services across multiple web interfaces and/or application interfaces in an online environment, in accordance with various embodiments.

Referring now to FIG. 5, an exemplary process 500 for providing contextual services to user 302 is shown, in accordance with various embodiments. Process 500 may continue from process 400. User 302 may visit a second merchant web page customized based on permitted information passed to merchant 308 (Step 502). The permissions for merchant 308 may differ from the permissions for merchant 306. In that regard, the contextual experience provided by merchant 308 via a customized web page may be customized based on the data accessible by merchant 308 based on the permissions entered by user 302.

In various embodiments, user 302 may save a second item from the second merchant page to the contextual services management system 7 (Step 504). The item and the context surrounding the web interaction with user 302 may be saved by merchant 308 and/or contextual services management system 7 for future use in providing contextual services to user 302.

In various embodiments, user 302 may access contextual services to view and compare the first item to the second item (Step 506). The comparison tool may be supported for user 302 by contextual services management system 7, merchant 306, merchant 308, and/or a third party interface provider. The items may be shown to user 302 on device 4 using images and/or data from the web site provided by merchant 306 and the web site provided by merchant 308. In that regard, contextual services management system may enable comparison of items that appear on different merchant web sites using a single user interface. The user interface may be provided by a native application running on user device 4 and/or a web interface via a web browser running on user device 4.

Figure 6:
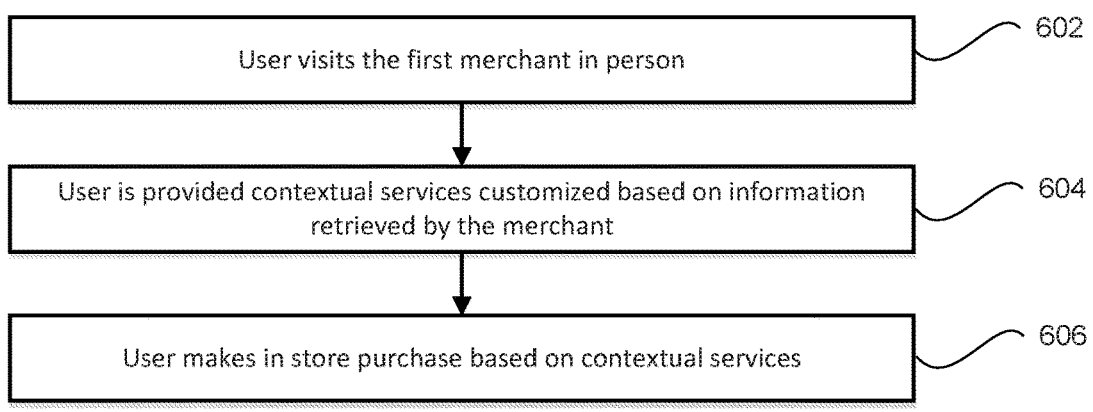
FIG. 6 illustrates a process for providing contextual services in response to a user visiting a physical merchant location, in accordance with various embodiments.

With reference to FIG. 6, an exemplary process 600 for providing user 302 with contextual services is shown, in accordance with various embodiments. Process 600, process 500, and/or process 400 may each continue from one another or be combined in whole or in part, with the steps appearing in any order, to provide contextual consumer services. Continuing from process 500 to process 600, user 302 may visit the first merchant in person (Step 602). The user presence at the merchant location may be detected using for example, an application running on user device 4 that broadcasts a BLE signal and/or responds to a detected BLE signal by identifying user 302 and/or user device 4 as being at the location of merchant 306. User presence may also be detected based on a geo-location of the user as detected by GPS on user device 4.

In various embodiments, in response to detecting user 302 present at merchant 306, merchant 306 may make request context and/or user information from contextual services management system 7. Contextual services management system 7 may return to merchant 306 the requested information. Contextual services management system 7 may limit the returned user information and/or context based on permissions entered by the user for merchant 306.

In various embodiments, user 302 may be provided with contextual services customized based on information retrieved by merchant 306 (Step 604). Merchant 306 may provide contextual services by retrieving the context of the user's previous web-based interactions and/or in-person interactions. For example, merchant 306 may retrieve the context of user 302 as saved in response to process 400 and process 500. Merchant 306 may identify that user 302 previously saved an item to contextual services management system 7 that was made available by the web site provided by merchant 306. Merchant 306 may, in response to the retrieved context, provide user 302 a discount offer for the first item as identified in previous user context. Merchant 306 may also, in response to the retrieved context, provide user 302 with immediate in-person assistance. Merchant 306 may, in response to the retrieved context, present the user with suitable alternative items and/or complimentary items that other users typically purchase in combination.

In various embodiments, user 302 may make an in-store purchase based on the contextual services (Step 606). The in-store purchase may be made in response to a discount offer provided as contextual services. Other contextual services may also be integrated into the purchase experience. For example, the user may be offered a discount or secondary suggested item at the point of sale.

Figure 7:
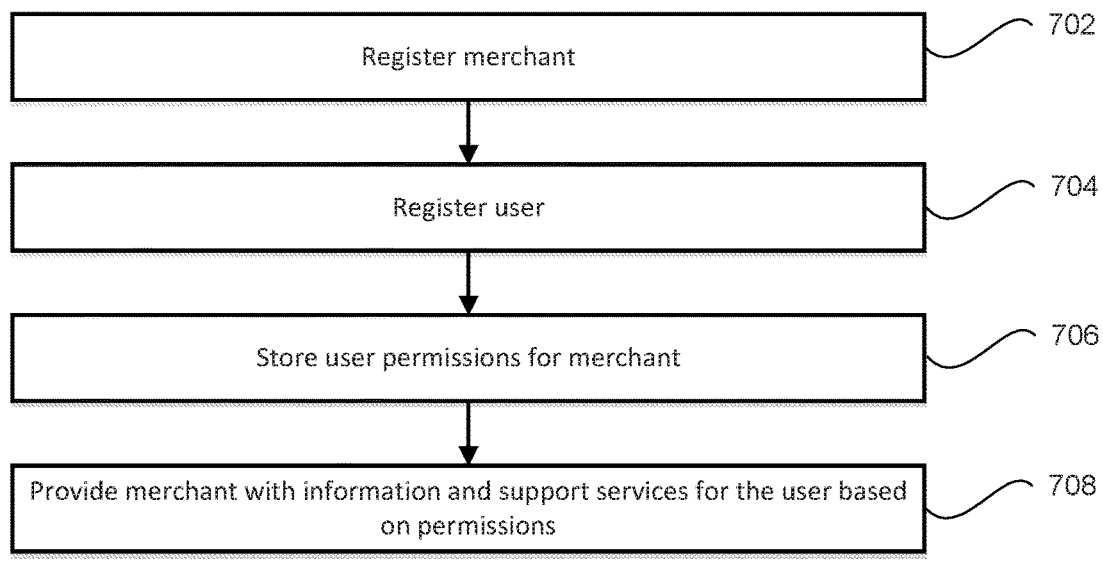
FIG. 7 illustrates a process for providing contextual services by applying user permissions to merchant API requests, in accordance with various embodiments.

Referring now to FIG. 7, an exemplary process 700 for providing contextual services is shown, in accordance with various embodiments. Process 700 may be executed by contextual services management system 7, merchant devices 24, user devices 4, and/or other suitable computer-based systems.

Contextual services management system 7 may register a merchant (Step 702). Merchant registration may include generating a merchant identifier and verifying the merchant identity. Registered merchants may authenticate with and/or communicate with contextual services management system 7 using the above referenced API. The API may enable merchants to retrieve context and/or user information to provide contextual services.

In various embodiments, contextual services management system 7 may also register a user (Step 704). User registration may include generating and/or storing a user identifier and user authentication data such as a password or biometric template, for example. User registration may further include collecting user preferences and user permissions. User registration may be conducted using a web interface or native application running on user device 4.

In various embodiments, contextual services management system 7 may store user permissions for the merchant (Step 706). Contextual services management system 7 may present the user with a list of information and/or context available for sharing with registered merchants. For each type of information and context, the user may set access permissions for various registered merchants. The permissions may be stored such that the permissions are accessible using a merchant identifier. For example, the permissions may be stored in a database with the merchant identifier and/or the user identifier configured as a key to each record. In that regard, the permissions for a specific merchant relative to a specific user may be selected using a user identifier and a merchant identifier. The access permissions may be applied by contextual services management system 7 to limit merchant access and thereby enhance the contextual experience provided to the user.

In various embodiments, contextual services management system 7 may provide the merchant with information and support services for the user based on the permissions (Step 708). The merchant may have access to information based on user permissions as described above. The merchant may also access support services for contextual services. For example, the API may enable the merchant to store items with and contextual services management system 7 for future use in relation to the user. For example, the user may choose to allow a first merchant to push information regarding user interaction with the first merchant up to contextual services management system 7 using an API call. The user may select to prohibit a second merchant from pushing information regarding user interaction with the first merchant up to contextual services management system 7 using an API call. In that regard, the user may limit the information and context merchants can retrieve from as well as share with contextual services management system 7.

Figure 8:
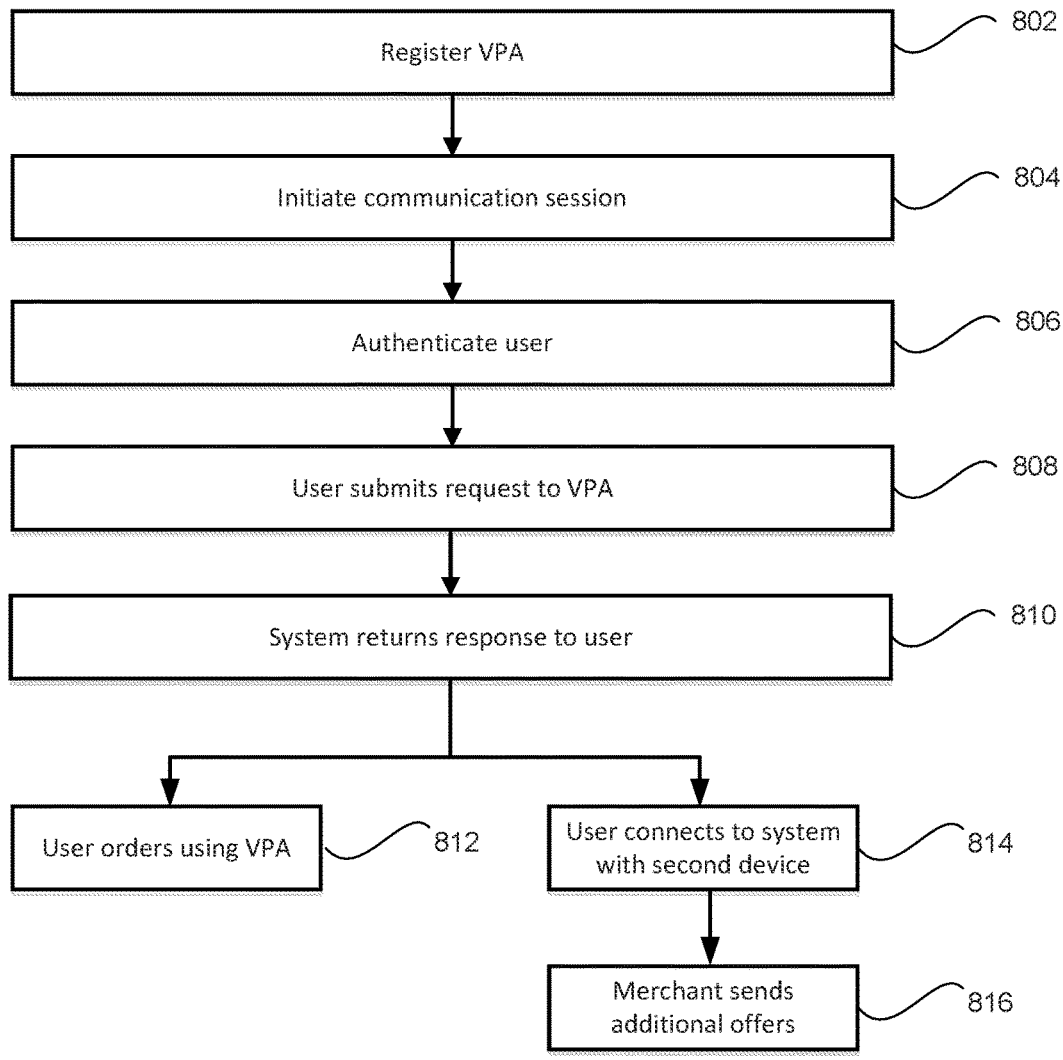
FIG. 8 illustrates a process for providing contextual services with a VPA, in accordance with various embodiments.

Referring to FIG. 8, a process 800 for providing contextual services with a VPA is illustrated according to various embodiments. A user may register a VPA with the contextual services management system (step 802). In various embodiments, the user may be a consumer, merchant, or machine (e.g. a "bot"). Registering the VPA may comprise providing authentication credentials to the contextual services management system and/or a transaction account provider, creating a voice pass phrase, adding user preferences, contextual attributes, selecting partner merchants, providing user demographic information (e.g. address), selecting a default transaction account, etc. In various embodiments, the VPA may be preloaded with some or all of the registration information prior to the user receiving the VPA. For example, the user may provide authentication credentials when purchasing the VPA, and the user may receive the VPA automatically set up with transaction account details, featured merchants, registered merchants and partners, preferences, etc. when delivered to the user. Thus, the VPA may be a "plug and play" device, such that the VPA may be used for transactions and contextual services with minimal user setup. The user may initiate a communication session with the VPA (step 804). In various embodiments, the user may speak a wake word to initiate the communication session, and the VPA may recognize the wake word and begin streaming data to a cloud computing system. The cloud computing system may initiate a session with the contextual services management system. In various embodiments, the user may speak a command to initiate the session with the contextual services management system, such as "start contextual app." In various embodiments, the cloud computing system may automatically initiate the session with the contextual services management system without an explicit command from the user. The contextual services management system may authenticate the user, for example by voice recognition or requesting that the user speak the voice pass phrase (step 806). In various embodiments, the voice pass phrase may be an active pass phrase which is set up by the user, or a passive pass phrase which is learned by the VPA after a period of conversation.

The user may speak an input to the VPA. In various embodiments, the input may be a command or a request (step 808). For example, a user may say, "Find me the best price on printer paper." The cloud computing system may transmit the input to the contextual services management system. The contextual services management system may select one or more merchants to interface with based on the input. For example, the contextual services management system may determine based on the input including "printer paper" that the contextual services management system should contact office supply merchants.

The contextual services management system may obtain the price for printer paper from each paper supply merchant. In various embodiments, the contextual services management system may search the merchant websites, transmit a request for a price to the merchant, or access merchant prices using an API. In various embodiments, the contextual services management system may determine from previous purchasing or internet behavior that the user typically purchases BRANDX paper. The contextual services management system may obtain the prices for BRANDX paper. The contextual services management system may select the merchant with the lowest price, and transmit a message to the VPA via the cloud computing system (step 810). The VPA may speak to the user, informing the user of the merchant and price.

In various embodiments, the user may order the printer paper by interacting with the VPA (step 812). The contextual services management system may access the user's transaction account information. In various embodiments, the user may have a default transaction account. In various embodiments, the contextual services management system may prompt the VPA to ask the user which of several transaction accounts the user would like to use. The user may select a transaction account, and the contextual services management system may complete the order using the transaction account. In various embodiments, the merchant may be registered with the contextual services management system as previously described herein. The merchant may receive contextual information about the user from the contextual services management system. Based on the contextual information, the merchant may provide an offer to the consumer. For example, the merchant may determine that the user often purchases toner when buying printer paper. The merchant may suggest that the user purchase toner, and may provide an offer of a discount to the consumer for purchasing toner along with the paper. The VPA may broadcast the offer to the user, and the user may choose whether to accept or decline the offer by speaking to the VPA.

In various embodiments, the user may request information regarding the user's transaction account from the contextual services management system. The user may request information such as current balance, payment dates, recent transactions, historical trends, etc. The contextual services management system may provide recommendations to the user. For example, the contextual services management system may inform the user that the user is incurring charges at a greater rate than the user's historical average, and the contextual services management system may suggest deferring non-critical purchases until the following billing cycle. The VPA may provide a list of purchases typically made but still outstanding. The user may instruct the VPA to recommend deferring specific purchases the next time the user attempts to order. The user may instruct the VPA to notify the user via a text message when the user is within a specified number of a user's spending limit.

The VPA may also provide recreational recommendations to the user. For example, the user may request a dinner recommendation using the VPA. The contextual services management system may suggest a specific type of restaurant based on the user's contextual information. The VPA may facilitate making a reservation with the restaurant, or checking the user in with the restaurant while the user is driving to the restaurant so that the user does not have to wait in line. The VPA may notify the user of the distance to the restaurant and the current wait time at the restaurant. The VPA may transmit a priority check in request to the restaurant at the appropriate time, such that the restaurant is ready to seat the user when the user arrives.

In various embodiments, session information may be shared over multiple devices. For example, rather than purchasing goods over the VPA, the user may search for goods and prices using the VPA, then visit a physical merchant location to purchase the goods. Once the user has received the best price on printer paper in step (810), the user may get in the user's vehicle to drive to the merchant. The contextual services management system may store the information from the user's interaction with the VPA. Upon entering or starting the vehicle, the vehicle's internet enabled device, such as a display panel, may connect to the contextual services management system (step 814). The contextual services management system may determine based on the VPA interaction that the user may like directions to the merchant. The contextual services management system may instruct the display panel to provide directions to the merchant, without the consumer requesting such directions. The user may arrive at the merchant location, and the user may walk within range of a BLE beacon. The merchant may provide the user with additional offers based on contextual information provided by the contextual services management system (step 816). After the user purchases the items and returns home, the VPA may ask the user if the user was happy with the purchase, and the VPA may make additional recommendations at that time or a later time based on the additional contextual information gathered on the user. Thus, the contextual services management system may provide services to the user seamlessly over multiple devices and continue to learn about the user's preferences over time.

Figure 9:
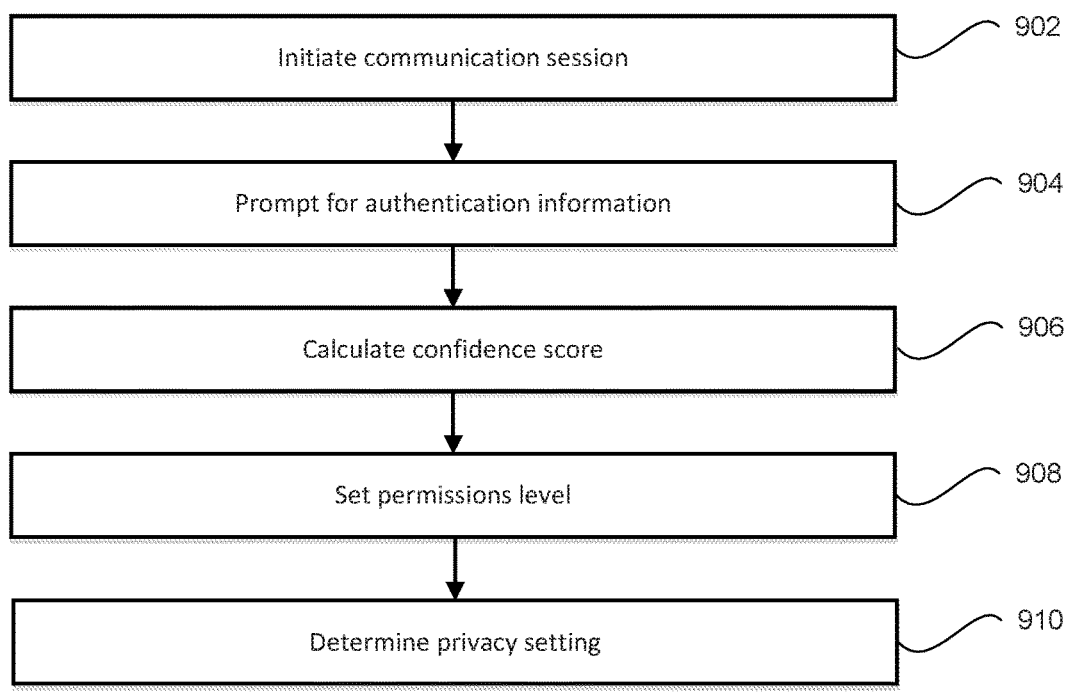
FIG. 9 illustrates a process for setting parameters for a device interaction, in accordance with various embodiments.

Referring to FIG. 9, a process for controlling parameters of a communication session is illustrated, according to various embodiments. A user may initiate a communication session with a device (step 902). The communication session may be initiated by a variety of methods, such as pressing a button, detecting presence of a user in a certain region, touching a screen, or speaking a command.

The device may prompt the user for authentication information (step 904). In various embodiments, the communication session initiation and user authentication may be performed simultaneously, such as by providing a fingerprint to wake a device. The user may input authentication information, such as a username or password, biometric information, etc. The device may transmit the type of authentication information, or the authentication information itself, to the contextual services management system. In various embodiments, the user may interact with the device without providing any authentication information.

The contextual services management system may calculate a confidence score (step 906). The confidence score may be a representation of how likely it is that the user is a particular individual. In various embodiments, the confidence score may be calculated in response to receiving the authentication information. In various embodiments, the contextual services management system may calculate the confidence score in response to the user requesting to access the device or initiate a transaction with the device, even if the user did not provide any authentication information to the device.

The confidence score may be calculated based on inputs from multiple devices. Calculation of the confidence score is further described with reference to FIG. 10. In various embodiments, the contextual services management system may continuously or periodically calculate the confidence score. In various embodiments, the confidence score may be calculated each time the user inputs a new request or other input to the device. In various embodiments, the confidence score may be recalculated each time a data point regarding the user from any device changes. For example, in response to the location of a smartphone changing, the confidence score may be recalculated.

In various embodiments, the various inputs may be stored in a temporary memory or a RAM and deleted after the confidence score is calculated. In various embodiments, each input may be converted to a score and the raw data may be deleted. Thus, in response to a security breach of the contextual services management system, any perpetrators may be limited to accessing data which is essentially meaningless to the perpetrator, even if the perpetrator were capable of cracking various encryption methods which may protect any stored data.

The contextual services management system may set a permissions level for the user based on the confidence score (step 908). The permissions level may define the actions that the user may take using the device. For example, a very low permissions level may prevent the user from accessing the device at all. As the permissions level increases, the user may perform actions such as accessing content on the device's local hard drive, accessing the internet, accessing financial information, making purchases, transferring funds between accounts, changing passwords, obtaining social security numbers, etc.

The contextual services management system may determine a privacy setting for the communication session (step 910). The contextual services management system may evaluate the contextual information to determine whether the user is in a private or public setting. In various embodiments, the contextual services management system may detect whether the device is on a home network of the user or a public network. The device may detect multiple voices with a microphone. A camera of the device may detect multiple people in the vicinity. In various embodiments, the device may ask the user whether the user is alone or whether it is ok to display confidential information.

In response to determining that the user is in a public setting, the contextual services management system may alter the type of information or method of communicating information shared between the user and the device. For example, rather than requesting that the user speak a password into the device, the device may request that the user type the password into the device. Similarly, the device to display confidential information rather than speaking the information, or the device may not provide the information at all.

In various embodiments, the contextual services management system may interpret verbal or visual cues from the user and adjust the privacy setting accordingly. In various embodiments, the user may speak to the device in a whisper or in a low volume, or the user may signal a public setting with a cough, gesture, or stored code word. In response the device may determine that the user is in a public setting and interact accordingly. In various embodiments, the user may nod, make hand gestures, or other physical movements, and the device may observe the movements with a camera in the device. The device may interpret the movements as inputs to the device. Similarly, the device may convey information to the user with gestures, such as facial gestures or movements of an avatar on a screen of the device. In various embodiments, the device may use symbols, emoji, text, or other graphical information to convey information to the user.

In various embodiments, in response to determining that multiple people are in the vicinity of the device, the device may provide contextual offers for multiple people. For example, the device may determine that a husband and a wife are both within range of a VPA, and the contextual services management system may ask the user if the user would like a coupon for dinner for two. In various embodiments, multiple individuals may have joint transaction accounts or have related transaction accounts. In various embodiments, the multiple individuals may be connected via a social media account. The contextual services management system may identify the relationship, and the device may provide information or offers based on the relationship.

Referring to FIG. 10, a table for calculating a confidence score is illustrated according to various embodiments. The system may evaluate data for multiple devices. In various embodiments, the user may have previously registered one or more of the devices with the contextual services management system. In various embodiments, the user may be logged in to an account on one or more of the devices. The requesting device may be the device for which the confidence score is being calculated. The confidence score may be calculated in response to a user attempting to login to the requesting device, initiate a transaction on the requesting device, or perform any other action on the requesting device.

The data for the devices may include information such as a device type, for example smartphone, television, VPA, smartwatch, etc. The contextual services management system may provide a factor score based on the device type. For example, devices which are typically used only by a particular individual, such as a smartphone, may receive a relatively high factor score (e.g. 10 out of 10). However, devices typically used by multiple people, such as a public computer in a library, may receive a relatively lower factor score (e.g. 3 out of 10).

The data may include a device location. In various embodiments, the location may be determined based on GPS tracking, a known fixed location (e.g. a registered home address for a television), IP address, location of a wireless network to which the device is connected, etc. A location factor score may be determined based on a comparison of a location of the requesting device and the device being evaluated. For example, in response to a device being at the same location as the requesting device, it may be more likely that the same user is interacting with both devices, and a relatively high factor score (e.g. 10 out of 10) may be calculated.

The data may include current activity for each device. For example, the contextual services management system may evaluate recent internet searches, television shows being watched, financial transactions, etc. In various embodiments, the contextual services management system may compare current activity with historical activity for a particular individual. In various embodiments, the contextual services management system may determine that a user is viewing a sporting event on a television at 2:00 PM on a Sunday.

The contextual services management system may compare this information with stored data that indicates the particular individual often watches sporting events on Sunday afternoons, and determine it is likely that the user watching the television is the particular individual. Similarly, the contextual services management system may compare recent financial transactions conducted on a device and compare the transactions to previous transactions by the particular individual to determine how likely it is that the particular individual performed the recent transaction. The information compared may include merchant, item, amount of transaction, shipping address, email address, etc.

The contextual services management system may evaluate the time since the last interaction with each device. In various embodiments, the time since the last interaction for a device may be used as a weighting factor, such that more recent interactions are given more weight. For example, interactions within the previous sixty seconds may receive a weighting factor of 1.0, such that the interaction is given its full weight. Interactions more than sixty seconds but less than five minutes prior may be given a weighting factor of 0.9, such that the interaction is considered at 90% of its full weight. Similarly, older interactions may be given smaller weighting factors.

In various embodiments, the system may evaluate the most recent type of authentication for each device. For example, if the user's last interaction with a device was authenticated using biometric information, it may be highly likely that the interaction was conducted by the user, and a high score may be provided for the authentication factor. If the user's last interaction was authenticated with a password, it may be moderately likely that the interaction was conducted by the user, and a medium score may be provided.

The contextual services management system may calculate a confidence score that the user is a particular individual based on the various factors evaluated. In various embodiments, the contextual services management system may add the various scores for each device to obtain the confidence score for the requesting device. In various embodiments, the score for each device may be weighted in calculating the final confidence score. The contextual services management system may assign a permissions level to the user and/or to the current transaction based on the confidence score, as previously described herein.

Figure 11:
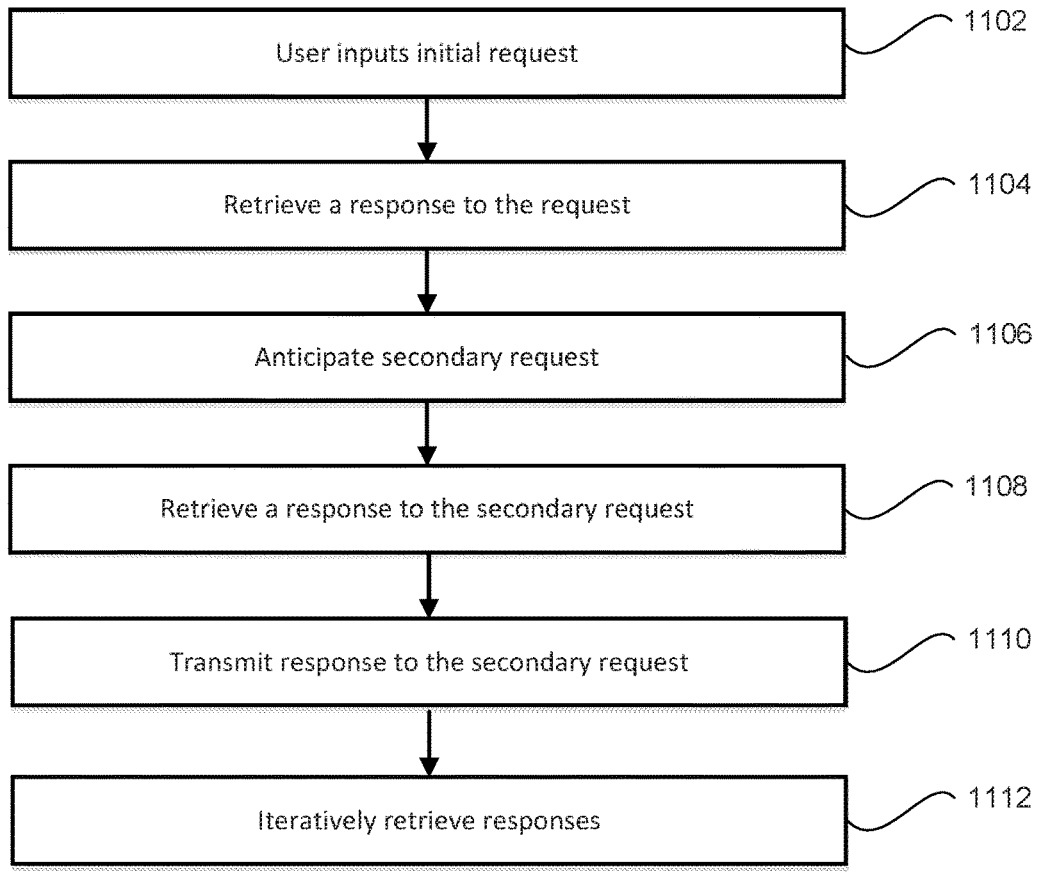
FIG. 11 illustrates a process for contextual injection, in accordance with various embodiments.

Referring to FIG. 11, a flowchart 1100 of a process for injecting contextual information is illustrated, according to various embodiments. Although a user may submit a particular request to the contextual services management system, the user may ultimately be looking for an answer to a different request, but the first request may be the first step in the inquiry. For example, a user may be concerned about whether they have sufficient remaining spend capability on a transaction account to purchase a specific item, but the first request the user submits to the contextual services management system may be to inquire about the account balance on the transaction account. Based on the data available to the contextual services management system relevant to the user, as well as data relevant to other users, the contextual services management system may predict the information that the user is ultimately concerned with, and the contextual services management system may provide the information without waiting for follow-up requests from the user. For example, the user may actually be desiring to know whether the user can afford a planned purchase (i.e. the user's "true intent"), and the contextual services management system may potentially offer a proposal to help the user afford the planned purchase, such as by offering a low interest loan to help carry the balance. Additionally, the contextual services management system may provide information to the user that the user would find helpful, but would not have otherwise requested.

A user may input an initial request to a device in communication with a contextual services management system (step 1102). The request may be input by a variety of methods, such as spoken, typed, or with a physical gesture. In various embodiments, the request may be a question, such as, "what is my account balance?" "what is the weather today?" or "how do I get to 1600 Pennsylvania Avenue?" In various embodiments, the request may be a command, such as, "transfer funds from savings to checking," "order an umbrella," or, "turn down the volume." In various embodiments, the request may be an action, such as the user clicking on a button or link on a web site, the user changing the temperature on a home thermostat, or the user turning onto a street, as detected by a vehicle or a GPS enabled mobile device. The device may transmit the request to the contextual services management system, and the contextual services management system may process the request.

The contextual services management system may retrieve a response to the request (step 1104). The contextual services management system may determine that the contextual services management system contains sufficient data for the response on a database, and the contextual services system may retrieve the data and transmit the response to the requesting device. In various embodiments, the requesting device may convert the response into the input format (e.g., for a VPA, the contextual services management system may transmit the response in a textual format, and the device may convert the response to a voice format and speak the response to the user). In various embodiments, the contextual services management system may determine that the contextual services management system does not have sufficient data for the response within the internal system, and the contextual services management system may access a third-party system utilizing an API to obtain sufficient data for the response. Each request may have a need and a system of record as to where the desired information may be obtained. In various embodiments, this information may be obtained dynamically based on the context of the session. For example, the contextual services management system may be a financial services provider, and the contextual services management system may retrieve data stored on internal databases to provide transaction account details, but the contextual services management system may utilize an API to order an umbrella from a third-party merchant for the user.

In various embodiments, the contextual services management system may retrieve the response from various accounts owned or operated by the user. For example, the contextual services management system may review data in social media accounts of the user, a user's electronic calendar, the user's blog entries, etc. The contextual services management system may evaluate both the substantive data in the entries, as well as metadata about the entries, such as when the entry was created.

The contextual services management system may anticipate a secondary request (step 1106). Based at least partially on the previous request, the contextual services management system may predict one or more secondary requests that the user is likely to subsequently request. The contextual services management system may utilize many data entries or history to determine a likely secondary request, as well as any number of subsequent requests for an ongoing conversation.

The contextual services management system may store previous sessions with the user. Based on the stored previous sessions, the contextual services management system may determine that for a particular request, the user often subsequently has a consistent second request. For example, each time a user submits a request of "what is my account balance," the contextual services management system may determine based on the stored previous sessions that 75% of the time, the user subsequently inputs a request of "when is my payment due." Similarly, each time the user inputs, "what is the weather today," the contextual services management system may determine based on the stored previous sessions that 30% of the time, the user subsequently inputs a request of "how much is a plane ticket to Hawaii?" In various embodiments the contextual services management system may utilize natural language processing and natural language understanding systems ("NLP/NLU"). The NLP/NLU systems may disambiguate words and phrases to similar intents and associate parameters. The NLP/NLU systems may be machine learning/neural net based systems (i.e. artificial intelligence "AI"). Additional AI refinement may be made beyond similarities to distil and predict the contextual injections in a recursive and conversational manner. The contextual services management system may leverage this capability to reserve items or services for a user in anticipation of a user request. For example, the contextual services management system may determine that it is likely that a user will request a concert ticket, and the contextual services management system may temporarily reserve the concert ticket prior to the user requesting the ticket.

In various embodiments, the anticipated secondary request may be based at least partially on a variety of data entries or other data associated with the user. For example, the contextual services management system may store, or have access to, information such as location of the user, recent financial transactions of the user, recent internet browser history, etc. As a user interacts with the system more and more, the contextual services management system may have access to larger amounts of data, which may increase the accuracy of the system's predictions. The contextual services management system may evaluate the data entries in conjunction with the user's first request in order to determine a likely secondary request. For example, in response to the user inputting a request of "what is my account balance," the contextual services management system may evaluate data entries indicating that: (1) the user has $1,000 of remaining spend limit on a transaction account; (2) the user recently performed an internet search for a new bicycle; and (3) the user is at a home address. The contextual services management system may determine that it is likely that the user is subsequently going to input a request to know where the user can purchase a bicycle close to the user's home and within the user's remaining spend limit.

In various embodiments, each data entry may be assigned a relevancy factor which weights the value of the data entry. For example, the more recent the data entry, the higher the relevancy factor may be. In various embodiments, the relevancy factor may range from 0 to 1. However, those skilled in the art will recognize that the relevance factor may be on any suitable scale. In various embodiments, there may be multiple related data entries, and the data entry which is more recent or has a higher relevancy factor may take precedence over the data entry with the lower relevancy score.

For example, a first data entry may be that the user performed an internet search for umbrellas three days ago, and the data entry may receive a relevancy factor of 0.5 based on the three day age of the data entry. A second data entry may be a transaction account transaction for purchasing an umbrella six hours ago, which may receive a relevancy factor of 0.7 based on the six hour age of the data entry. The second data entry may make the first data entry obsolete, as it may be less likely that the user is still interested in purchasing an umbrella after already purchasing an umbrella six hours prior. Thus, the contextual services management system may decrease the relevancy factor of the first data entry to as low as zero. A variety of factors may be utilized to calculate a relevancy factor, such as a user's age, location, spend power, etc., including data that is gathered during a current session. In various embodiments, the contextual services management system may calculate relevancy factors using the processes and considerations described with reference to FIG. 10.

In various embodiments, the anticipated secondary request may be based at least partially on a variety of data entries associated with other users. The contextual services management system may evaluate the request from the user and the data entries associated with the user, and the contextual services management system may compare this information with data entries of other users and the subsequent requests of the other users with similar data entries. The contextual services management system may determine that other users with similar data entries often make a particular secondary request, and the contextual services management system may anticipate that the user will make the same request.

In various embodiments, the contextual services management system may anticipate multiple secondary requests that the user may make. For example, the contextual services management system may determine that it is 30% likely that the user will make a first secondary request, 20% likely that the user will make a second secondary request, and 10% likely that the user will make a third secondary requests. In various embodiments, the contextual services management system may anticipate a fixed number of secondary requests, such as three, regardless of the likelihood of each secondary request. The contextual services system may select the three secondary requests with the highest likelihood that the user will input the secondary response. In various embodiments, the contextual services management system may anticipate all secondary requests over a threshold level. For example, the contextual services management system may anticipate all secondary requests for which there is at least a 10% likelihood that the user will input the secondary request.

The contextual services management system may retrieve responses to one or more secondary requests (step 1108). The contextual services management system may retrieve the responses from internal or third party databases or servers. In various embodiments, the contextual services management system may retrieve the responses to the secondary requests simultaneously as the response to the initial request. In various embodiments, the contextual services management system may first retrieve the response to the initial request, then retrieve the responses to the secondary requests, while transmitting the response to the first request to the user device. In various embodiments, the contextual services management system may store the responses to the secondary requests in a temporary memory, such as a random-access memory, or other location where the responses may be quickly fetched.

The contextual services management system may transmit the response to the secondary requests to the device (step 1110). In various embodiments, the contextual services management system may transmit the responses to the secondary requests in response to the initial request, such that the user is presented with the responses to the secondary requests without inputting the secondary requests. For example, the user may input an initial request of "what's my account balance." The contextual services management system may anticipate that a secondary request may be related to purchasing a bicycle close to the user's home. The contextual services management system may transmit a response to the initial request and a response to one or more secondary requests to the user device, such that the device's output to the user is "Your account balance is $500.00. You have enough remaining spend limit to buy a bicycle at ACME, Inc., which is located two blocks away. Would you like directions?" Thus, the contextual services management system may provide answers to the questions which the user ultimately cares about, even though the user only input a request for a first piece of information, in this example the information being the account balance.

In various embodiments, the contextual services management system may wait for the user to input the secondary request prior to transmitting the response to the secondary request. However, because the contextual services management system may have already retrieved the response to the secondary requests based on the anticipated secondary requests, the contextual services management system may quickly return the saved response to the user device. This may decrease latency between the time of the secondary request and transmitting the response to the secondary request. For each subsequent request, the contextual services management system may obtain additional responses for potential future requests. The responses may be saved for future reference.

The contextual services management system may iteratively retrieve responses to anticipated requests (step 1112). Each time the user inputs a request to the user device, the contextual services management system may store the input as a new data field, and the contextual services management system may anticipate additional secondary requests. Thus, as a communication session continues, the contextual services management system may have better information with each request, which allows the contextual services management system to better predict the next request from the user. The response for each request may be inferred based on contextual data in conjunction with user request parameters, inference rules, machine learning, neural nets, etc.

In various embodiments, the contextual services management system may transmit responses or offers to the user device based on a determination that the user may be interested in the response or offer. Even if the contextual services management system does not anticipate that a user may input a particular request, the contextual services management system may determine that the user would be likely to appreciate or respond to a particular response or offer based on the stored data fields or other information about the user and/or other users. Thus, the contextual services management system may provide desirable content to the user, even without the user specifically requesting such content.

In various embodiments, the contextual services management system may provide responses or offers to devices which do not typically provide an interface for inputting request and receiving responses in the manner described herein. For example, based on a user's input to a VPA, the contextual services management system may transmit content to various internet of things ("IoT") devices, such as an internet enabled home thermostat. The contextual services management system may receive a request from the user inquiring about the weather, and in response to the user turning up the thermostat, the contextual services management system may transmit content to the thermostat via an API which displays an offer for a discount on insulated window blinds.

Those skilled in the art will appreciate that the specific examples provided herein are just some examples of the many types of requests, data fields, and uses of a contextual services management system which anticipates and injects content into a session with a user. By anticipating the user's requests and needs, the contextual services management system may more quickly provide useful content to the user, as well as provide content which the user would not otherwise receive.

The contextual services disclosed herein may support in-person and web-based context for future use with users. The contextual services may also provide user information to merchants for further customization and contextual services. Users of the present contextual systems may also control merchant access to user data and thereby control their own contextual experiences. The present contextual service systems thus facilitate highly relevant and customized engagements with service providers across applications and web sites, devices, and physical locations.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with," "identify" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The customer may be identified as a customer of interest to a merchant based on the customer's transaction history at the merchant, types of transactions, type of transaction account, frequency of transactions, number of transactions, lack of transactions, timing of transactions, transaction history at other merchants, demographic information, personal information (e.g., gender, race, religion), social media or any other online information, potential for transacting with the merchant and/or any other factors. The merchant may make API calls to retrieve available context for customers of interest.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, Facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

A record of charge (or "ROC") may comprise any transaction or transaction data. The ROC may be a unique identifier associated with a transaction. A transaction may, in various embodiments, be performed by a one or more members using a transaction account, such as a transaction account associated with a gift card, a debit card, a credit card, and the like. A ROC may, in addition, contain details such as location, merchant name or identifier, transaction amount, transaction date, account number, account security pin or code, account expiry date, and the like for the transaction.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA® SYSTEM WEB SERVER).

A web client includes any device (e.g., personal computer) which communicates via any network, for example such as user devices 4 discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS®/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" may be any suitable identifier that uniquely identifies an item. For example, the identifier may be a globally unique identifier ("GUID") used to identify a device and/or user in the context of BLE. The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, AppleTalk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

Any databases discussed herein may include relational, hierarchical, graphical, or object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® Applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

In various embodiments, the system and method may include alerting a merchant when a user device is on site. The system may include generating customized information and alerting a merchant that the information can be accessed from a merchant device. The alerts are generated by detecting a user presence at a merchant location and building information alerts and formatting the alerts based upon merchant preference information. The alerts may be transmitted to a merchant device which, when connected to the computer, causes the computer to auto-launch an application to display contextual services to the user. More particularly, the method may comprise providing a viewer application to a user for installation on the remote user device; receiving contextual services at the user device sent from a data source over the Internet, the transmission server comprising a microprocessor and a memory that stores the user's preferences for contextual services, destination address, specified information, wherein the microprocessor filters the received information by comparing requests for contextual services to user permissions; generates contextual service message; and transmits the contextual service message over a wireless communication channel to a user device associated with the user based upon the destination address and transmission schedule, wherein the alert activates the application to cause the contextual services to display on the user device.

In various embodiments, the system may also address the problem of retaining control over customers during affiliate purchase transactions, using a system for co-marketing the "look and feel" of the context services interfaces with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information.

The server constructs a composite web page using the retrieved "look and feel" information of the host web page, with the product-related content embedded within it, so that the composite web page is visually perceived by the customer as associated with the host web page. The server then transmits and presents this composite web page to the customer so that they effectively remain on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers.

More particularly, the system may be useful in an outsource provider serving web pages offering contextual services. The computer store containing data, for each of a plurality of merchant web pages and contexts, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page and/or contextual services; and using the data retrieved, automatically generate and transmit to the web browser a second web page that displays: information associated with the commerce object associated with the link that has been activated, and the plurality of visually perceptible elements visually corresponding to the source page and/or contextual services.

In various embodiments, the system and method may include alerting a subscriber when their computer is offline. The system may include generating customized information and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims.

Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   receiving, by a computer-based system, an initial request from a first device;
   detecting, by the computer-based system, a location of the first device;
   authenticating, by the computer-based system, a user of the first device based on a detected location of the first device;
   generating, by the computer-based system, a confidence score representing a likelihood that the user of the first device is correctly identified from authenticating the user;
   storing, by the computer-based system, the initial request in a database;
   retrieving, by the computer-based system, a response to the initial request from the database in response to the confidence score exceeding a minimum score;
   predicting, by the computer-based system, a secondary request from the first device based at least in part on the initial request and information associated with the user of the first device;
   storing, by the computer-based system, the secondary request in the database;
   determining, by the computer-based system, a likelihood that the computer-based system will receive the secondary request by evaluating data field entries of the user with data field entries of other users in the database;
   retrieving, by the computer-based system, a response to the secondary request from a database server in response to the likelihood being above a threshold level; and
   in response to the initial request from the first device, transmitting, by the computer-based system and to the first device, the response to the secondary request without receiving the secondary request from the first device.

2. The method of claim 1, further comprising storing, by the computer-based system, the response to the secondary request in a temporary memory of the computer-based system.

3. The method of claim 1, further comprising retrieving, by the computer-based system, the response to the secondary request simultaneously with transmitting the response to the initial request to the first device.

4. The method of claim 1, further comprising:
   predicting, by the computer-based system and based on the initial request and the secondary request, a third request from the first device;
   storing, by the computer-based system, the third request in the database;
   retrieving, by the computer-based system, a response to the third request; and
   transmitting, by the computer-based system and to the first device, the response to the third request.

5. The method of claim 1, wherein the confidence score is periodically calculated.

6. The method of claim 1, wherein the confidence score is generated based on an additional input from an additional device associated with the user.

7. The method of claim 1, wherein the response to the second request comprises a reservation for a good or service that is anticipated to be requested by the first device.

8. The method of claim 1, wherein the information associated with the user of the first device comprises the location of the first device.

9. A computer-based system, comprising:
a processor; and
a tangible, non-transitory memory configured to communicate with the processor, the tangible, non-transitory memory having instructions stored thereon that, in response to execution by the processor, cause the processor to perform operations comprising:
   receiving, by the processor, an initial request from a first device;
   detecting, by the processor, a location of the first device;
   authenticating, by the processor, a user of the first device based on a detected location of the first device;
   generating, by the processor, a confidence score representing a likelihood that the user of the first device is correctly identified from authenticating the user;
   storing, by the processor, the initial request in a database;
   retrieving, by the processor, a response to the initial request from the database in response to the confidence score exceeding a minimum score;
   predicting, by the processor, a secondary request from the first device based at least in part on the initial request and information associated with the user of the first device;
   storing, by the processor, the secondary request in the database;
   determining, by the processor, a likelihood that the computer-based system will receive the secondary request by evaluating data field entries of the user with data field entries of other users in the database;
   retrieving, by the processor, a response to the secondary request from a database server in response to the likelihood being above a threshold level; and
   in response to the initial request from the first device, transmitting, by the processor, the response to the secondary request to the first device without receiving the secondary request from the first device.

10. The system of claim 9, further comprising storing, by the processor, the response to the secondary request in a temporary memory of the computer-based system.

11. The system of claim 9, further comprising retrieving, by the processor, the response to the secondary request simultaneously with transmitting the response to the initial request to the first device.

12. The system of claim 9, further comprising:
predicting, by the processor and based on the initial request and the secondary request, a third request from the first device;
storing, by the processor, the third request in the database;
retrieving, by the processor, a response to the third request; and
transmitting, by the processor and to the first device, the response to the third request.

13. The system of claim 9, wherein the confidence score is periodically calculated.

14. The system of claim 9, wherein the confidence score is generated based on an additional input from an additional device associated with the user.

15. The system of claim 9, wherein the information associated with the user of the first device comprises the location of the first device.

16. An article of manufacture including a non-transitory, tangible computer readable storage medium having instructions stored thereon that, in response to execution by a computer-based system, cause the computer-based system to perform operations comprising:
   receiving, by the computer-based system, an initial request from a first device;
   detecting, by the computer-based system, a location of the first device;
   authenticating, by the computer-based system, a user of the first device based on a detected location of the first device;
   generating, by the computer-based system, a confidence score representing a likelihood that the user of the first device is correctly identified from authenticating the user;
   storing, by the computer-based system, the initial request in a database;
   retrieving, by the computer-based system, a response to the initial request from the database in response to the confidence score exceeding a minimum score;
   predicting, by the computer-based system, a secondary request from the first device based at least in part on the initial request and information associated with the user of the first device;
   storing, by the computer-based system, the secondary request in the database;
   determining, by the computer-based system, a likelihood that the computer-based system will receive the secondary request by evaluating data field entries of the user with data field entries of other users in the database;
   retrieving, by the computer-based system, a response to the secondary request from a database server in response to the likelihood being above a threshold level; and
   in response to the initial request from the first device, transmitting, by the computer-based system and to the first device, the response to the secondary request without receiving the secondary request from the first device.

17. The article of manufacture of claim 16, further comprising storing, by the computer-based system, the response to the secondary request in a temporary memory of the computer-based system.

18. The article of manufacture of claim 16, further comprising retrieving, by the computer-based system, the response to the secondary request simultaneously with transmitting the response to the initial request to the first device.

19. The article of manufacture of claim 16, wherein the confidence score is periodically calculated.

20. The article of manufacture of claim 16, wherein the confidence score is generated based on an additional input from an additional device associated with the user.

* * * * *